(12) United States Patent
Kwak et al.

(10) Patent No.: US 11,922,842 B2
(45) Date of Patent: Mar. 5, 2024

(54) ELECTRONIC DEVICE HAVING EXTENDABLE DISPLAY AND METHOD FOR PROVIDING CONTENT THEREOF

(71) Applicant: SAMSUNG ELECTRONICS CO., LTD., Suwon-si (KR)

(72) Inventors: Myunghoon Kwak, Suwon-si (KR); Moonjeong Kim, Suwon-si (KR); Taeyeong Kim, Suwon-si (KR); Sunghwan Park, Suwon-si (KR); Jookwan Lee, Suwon-si (KR); Yangwook Kim, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 17/749,684

(22) Filed: May 20, 2022

(65) Prior Publication Data
US 2022/0383786 A1   Dec. 1, 2022

Related U.S. Application Data

(63) Continuation of application No. PCT/KR2022/006071, filed on Apr. 28, 2022.

(30) Foreign Application Priority Data

May 26, 2021  (KR) .......................... 10-2021-0067678

(51) Int. Cl.
*G06F 3/04886* (2022.01)
*G09G 3/00* (2006.01)
(Continued)

(52) U.S. Cl.
CPC ......... *G09G 3/035* (2020.08); *G06F 3/04886* (2013.01); *H04M 1/0268* (2013.01);
(Continued)

(58) Field of Classification Search
CPC ............. G06F 3/04886; G06F 3/04817; G06F 3/0482; G09G 3/035; G09G 2354/00;
(Continued)

(56) References Cited

U.S. PATENT DOCUMENTS 9,262,053 B2    2/2016  Jegal et al.
9,609,225 B2    3/2017  Kwon et al.
(Continued)

FOREIGN PATENT DOCUMENTS

CN    107103840    8/2017
CN    110688179    1/2020
(Continued)

OTHER PUBLICATIONS

Search Report and Written Opinion dated Aug. 10, 2022 issued in International Patent Application No. PCT/KR2022/006071.

*Primary Examiner* — Lisa S Landis
(74) *Attorney, Agent, or Firm* — Nixon & Vanderhye P.C.

(57) ABSTRACT

An electronic device according to various embodiments may include: a housing, a flexible display having at least a partial area configured to be drawn out from the housing so that a size of a visible area of the flexible display can be changed, a sensor configured to measure a length of the flexible display, a memory, a processor operatively connected to the memory, the sensor, and the flexible display. The processor may be configured to control the electronic device to: display a first content including at least one image in a first area including a partial area of the flexible display in response to an input, measure a length of the flexible display drawn out from the housing using the sensor, based on the length of the flexible display measured using the sensor being a specified first length, determine that the electronic device is in a non-expanded state, and based on the length of the flexible display measured using the sensor being a second length longer than the first length, determine that the (Continued)

electronic device is in an expanded state. In addition, the processor may be configured to control the electronic device to: based on the electronic device being in an expanded state, display the first content in the first area, and display a user interface corresponding to at least one application and/or second content obtained by converting the first content into a form corresponding to a function provided by the at least one application in a second area including a partial area of the flexible display, drawn out from the housing to be visible, and transmit, in response to an input, data corresponding to the first content to a server connected to the at least one application.

19 Claims, 24 Drawing Sheets

(51) Int. Cl.
*H04M 1/02* (2006.01)
*H04W 4/21* (2018.01)
*G06F 3/04817* (2022.01)
*G06F 3/0482* (2013.01)

(52) U.S. Cl.
CPC ........... *H04W 4/21* (2018.02); *G06F 3/04817* (2013.01); *G06F 3/0482* (2013.01); *G09G 2354/00* (2013.01); *G09G 2370/022* (2013.01); *H04M 2250/12* (2013.01)

(58) Field of Classification Search
CPC .............. G09G 2370/022; H04W 4/21; H04M 1/0268; H04M 2250/12
See application file for complete search history.

(56) References Cited

U.S. PATENT DOCUMENTS

| | | | |
|---|---|---|---|
| 10,657,926 B2 | 5/2020 | Shin et al. | |
| 10,853,015 B2 | 12/2020 | Kong et al. | |
| 11,262,800 B2 | 3/2022 | Kim et al. | |
| 2014/0055376 A1 | 2/2014 | Baek et al. | |
| 2015/0338888 A1* | 11/2015 | Kim | G06F 1/1643 |
| | | | 345/156 |
| 2016/0349971 A1* | 12/2016 | Chi | G09G 5/373 |
| 2018/0335848 A1* | 11/2018 | Moussette | G06F 3/0484 |
| 2022/0291723 A1 | 9/2022 | Otomasu | |

FOREIGN PATENT DOCUMENTS

| | | |
|---|---|---|
| JP | 5885152 | 3/2016 |
| KR | 10-2016-0139320 | 12/2016 |
| KR | 10-2016-0150539 | 12/2016 |
| KR | 10-1708775 | 3/2017 |
| KR | 10-2017-0082369 | 7/2017 |
| KR | 10-2018-0129432 | 12/2018 |
| KR | 10-2019-0031870 | 3/2019 |
| KR | 10-2014776 | 10/2019 |
| KR | 10-2074516 | 2/2020 |
| WO | 2021/033221 | 2/2021 |

* cited by examiner

FIG. 7
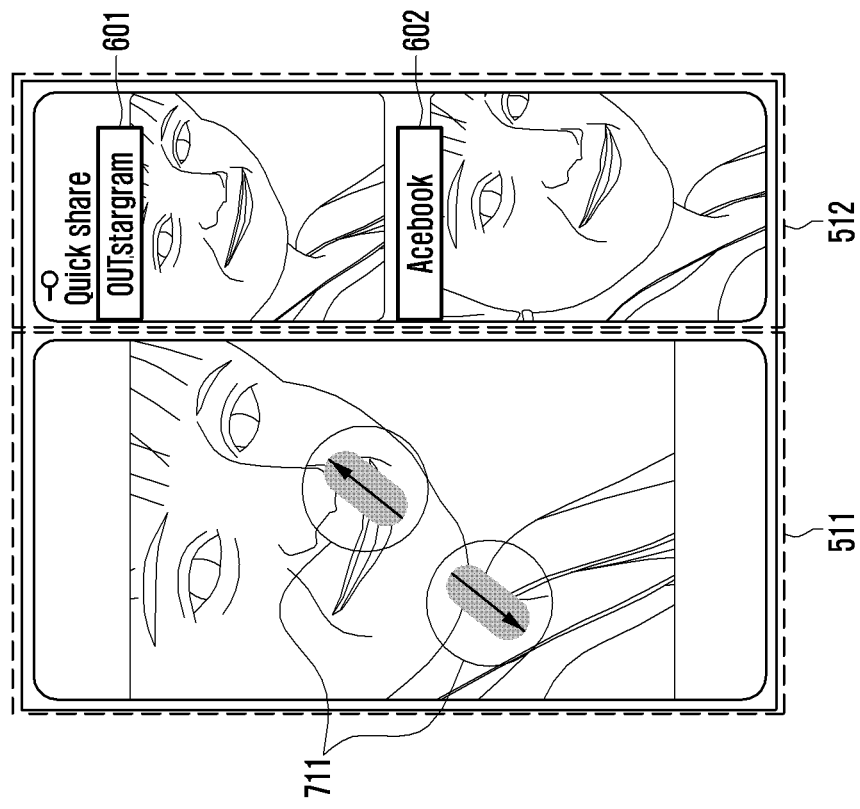
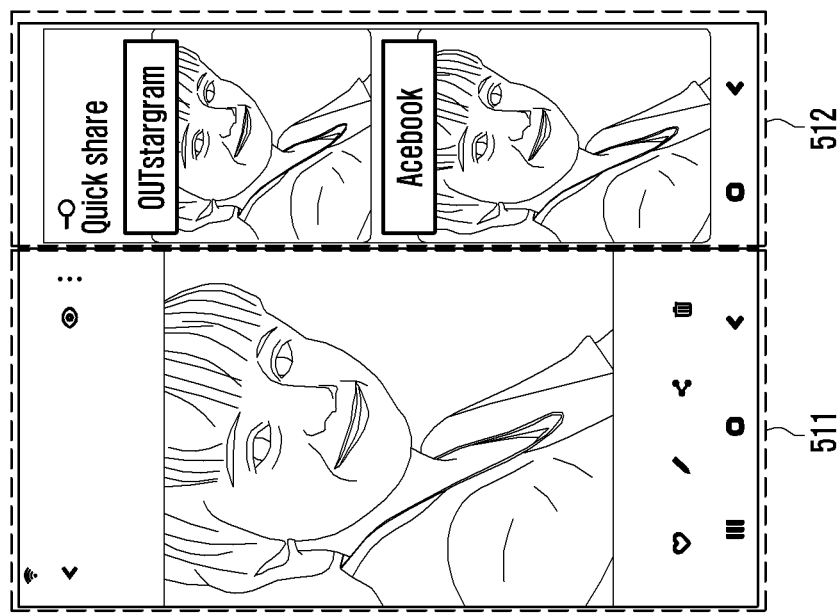

FIG. 8
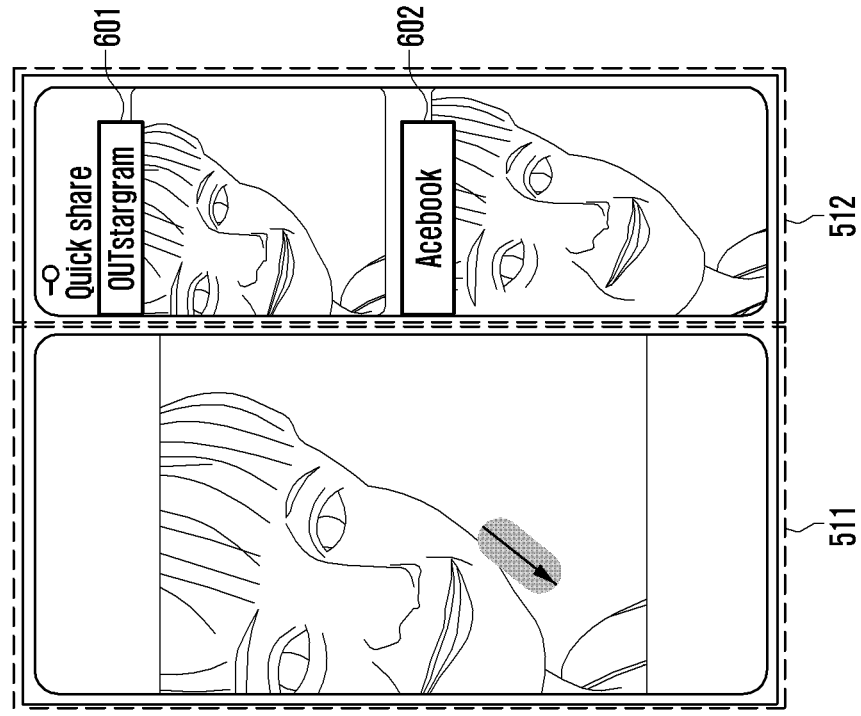
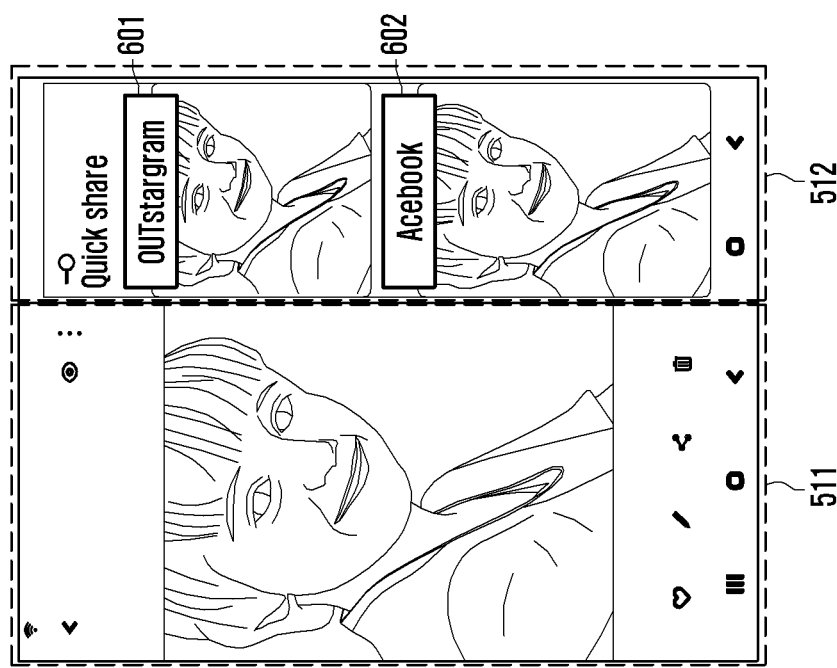

ELECTRONIC DEVICE HAVING EXTENDABLE DISPLAY AND METHOD FOR PROVIDING CONTENT THEREOF

CROSS-REFERENCE TO RELATED APPLICATIONS

This application is a continuation of International Application No. PCT/KR2022/006071 designating the United States, filed on Apr. 28, 2022, in the Korean Intellectual Property Receiving Office and claiming priority to Korean Patent Application No. 10-2021-0067678, filed on May 26, 2021, in the Korean Intellectual Property Office, the disclosures of which are incorporated by reference herein in their entireties.

BACKGROUND

Field

The disclosure relates to an electronic device and may include, for example, an electronic device including an extendable display and a method for providing content by an electronic device.

Description of Related Art

In line with development of mobile communication and hardware/software technologies, portable electronic devices epitomized by smartphones (hereinafter, simply referred to as electronic devices) have evolved to such an extent that they can incorporate various functions. An electronic device may include a touchscreen-based display such that the user can easily access various functions, and may provide various application screens through the display.

Electronic devices having displays of various form factors have recently been developed to provide various user experiences and to satisfy space-related efficiency. For example, electronic devices may include an extendable display, such as a slidable, rollable, or foldable display.

When contents (mages) are uploaded to a social network service (SNS), the uploaded contents may need to be modified. Modification of the uploaded contents using a limited display may proceed in the following process: an application inside the electronic device is executed to modify the contents, and the modified contents are then uploaded by an SNS application. This process may be inconvenient in that the SNS application needs to be ended, the application inside the electronic device needs to be executed to modify the contents, and the SNS application is again driven to upload the modified contents.

In addition, when the contents are modified using the SNS application per se, it may be convenient to apply various filter effects and upload the contents. However, it may be difficult to utilize the modified contents in the case of a different type of SNS application. To this end, the modified contents may be stored inside the electronic device and used for another SNS application, but separately storing the contents in the electronic device may be inconvenient.

SUMMARY

An electronic device according to various example embodiments may include: a housing, a flexible display having at least a partial area configured to be drawn out from the housing so that a size of a visible area of the flexible display can be changed, a sensor configured to measure a length of the flexible display, a memory, and a processor operatively connected to the memory, the sensor, and the flexible display. The processor may be configured to control that the electronic device to: display first content including at least one image in a first area including a partial area of the flexible display, in response to an input, measure a length of the flexible display from the housing using the sensor, based on the length of the flexible display measured using the sensor being a specified first length, determine that the electronic device is in a non-expanded state, and based on the length of the flexible display measured using the sensor being a second length longer than the first length, may determine that the electronic device is in an expanded state. In addition, the processor may be configured to control that the electronic device to: based on the electronic device being in an expanded state, display the first content in the first area, and display a user interface corresponding to at least one application and/or second content obtained by converting the first content into a form corresponding to a function provided by the at least one application in a second area including a partial area of the flexible display, drawn out from the housing to be visible, and may transmit, in response to an input, data corresponding to the first content to a server connected to the at least one application.

A method for providing content by an electronic device according to various embodiments may include: controlling the electronic device to display first content including at least one image in a first area including a partial area of the flexible display, in response to an input, measuring a length of the flexible display drawn out, using a sensor, based on the length of the flexible display measured using the sensor being a specified first length, determining that the electronic device is in a non-expanded state, and based on the length of the flexible display measured using the sensor being a second length longer than the first length, determining that the electronic device is in an expanded state, based on the electronic device being in an expanded state, displaying the first content in the first area, and displaying a user interface corresponding to at least one application and/or second content obtained by converting the first content into a form corresponding to a function provided by the at least one application in a second area including a partial area of the flexible display, drawn out from the housing to be visible, and transmitting, in response to an input, data corresponding to the first content to a server connected to the at least one application.

According to various example embodiments, in connection with an expansion operation of an electronic device including an expandable display, images inside the electronic device and on an SNS application may be edited simultaneously. This may make it easy to upload contents to the SNS application, and may reduce the inconvenient process of editing contents inside the electronic device and driving the SNS application again to upload the modified contents.

According to various example embodiments, SNS application filter effects and the like may be downloaded in advance and then used to edit contents inside the electronic device. This may integrate the process of storing contents inside the electronic device and the process of uploading the same to the SNS application. In addition, contents having a single SNS application editing effect applied thereto may be uploaded to another SNS application.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a diagram illustrating an example content screen and an application screen which are synchronized with each other when the electronic device 500 is expanded according to various embodiments;

FIG. 8 is a diagram illustrating an example content screen and an application screen which are synchronized with each other when the electronic device 500 is expanded according to various embodiments;

DETAILED DESCRIPTION

Figure 1:
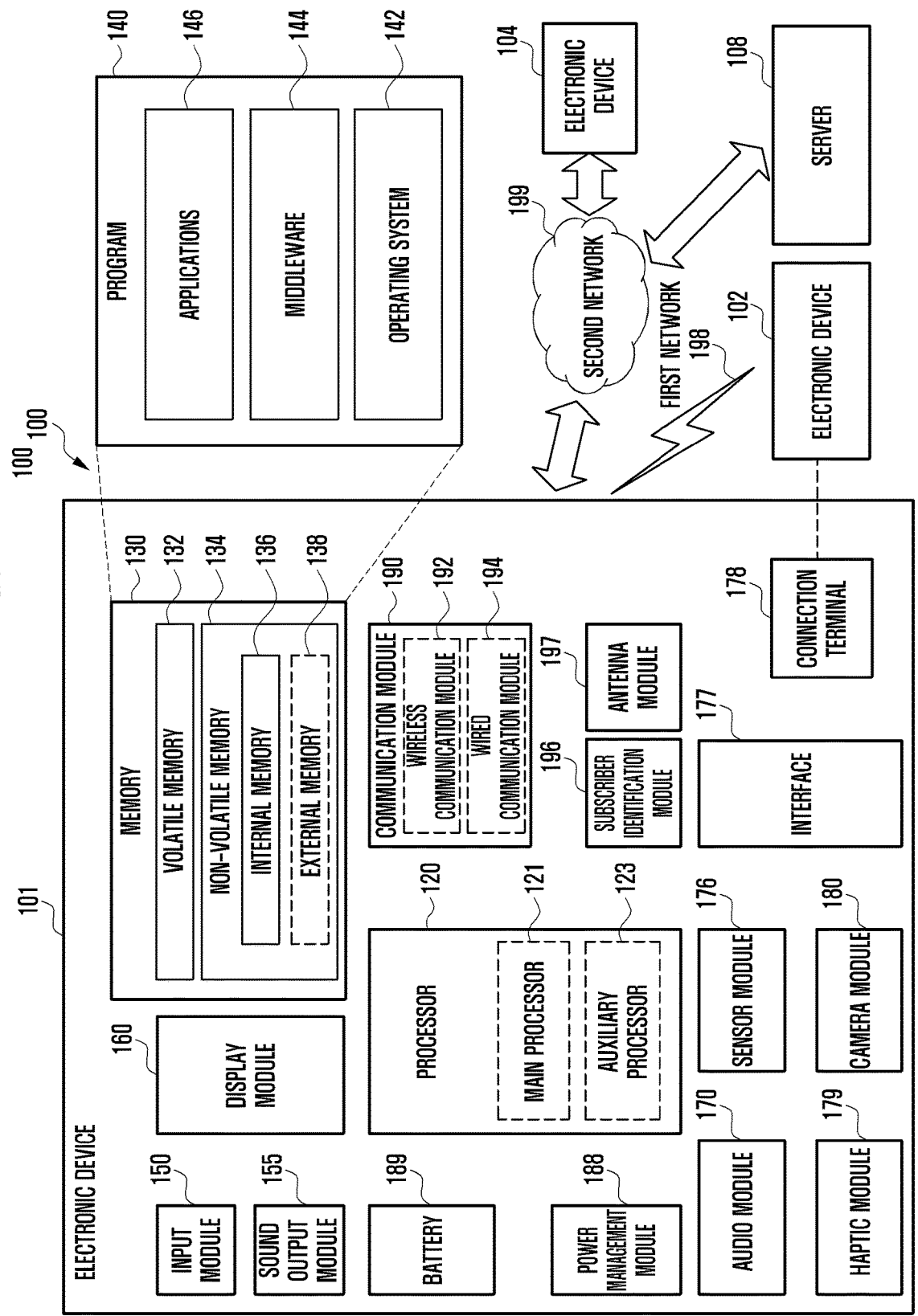
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
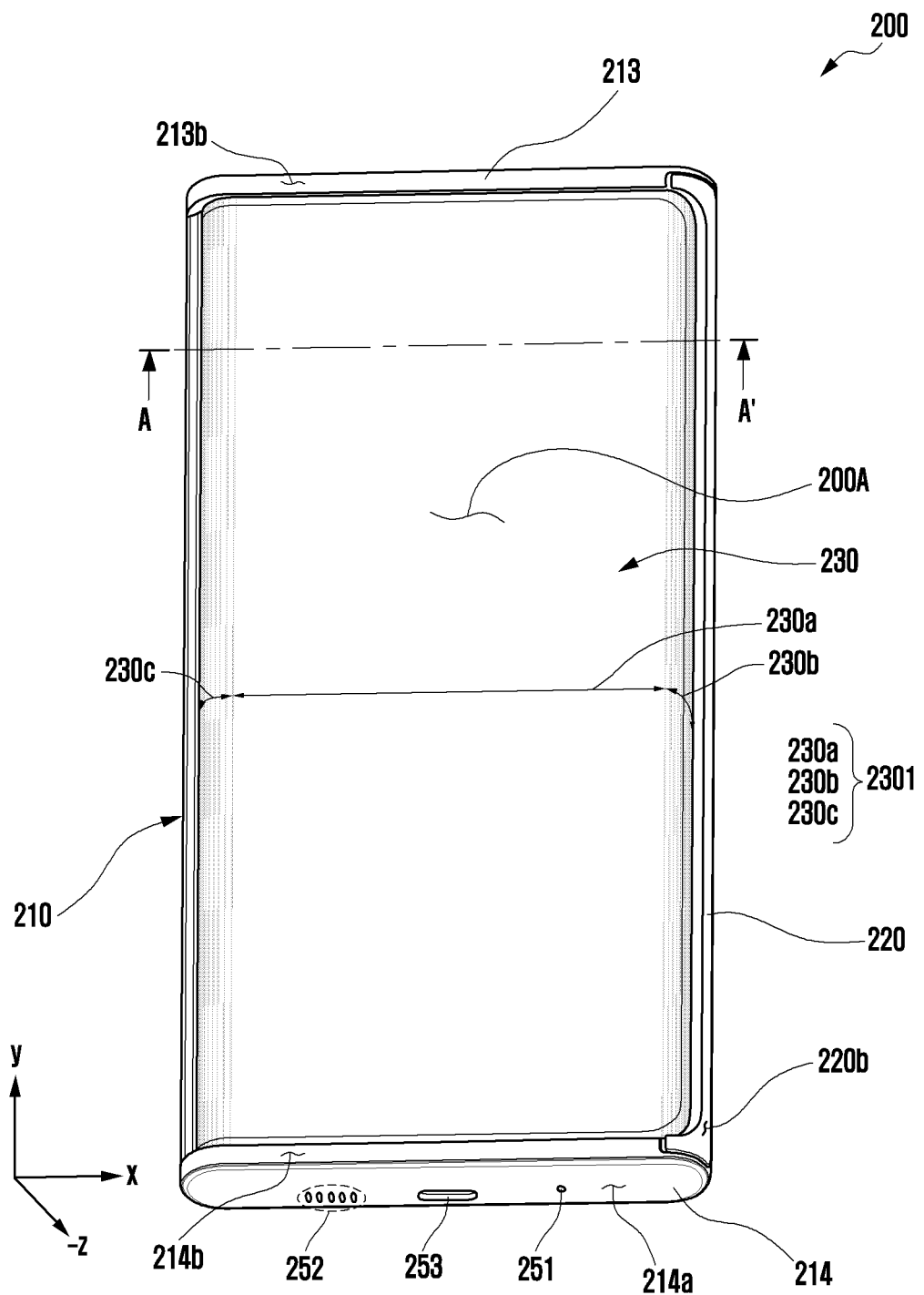
FIG. 2A is a front perspective view of an electronic device 200 in a closed state according to various embodiments.
Figure 2B:
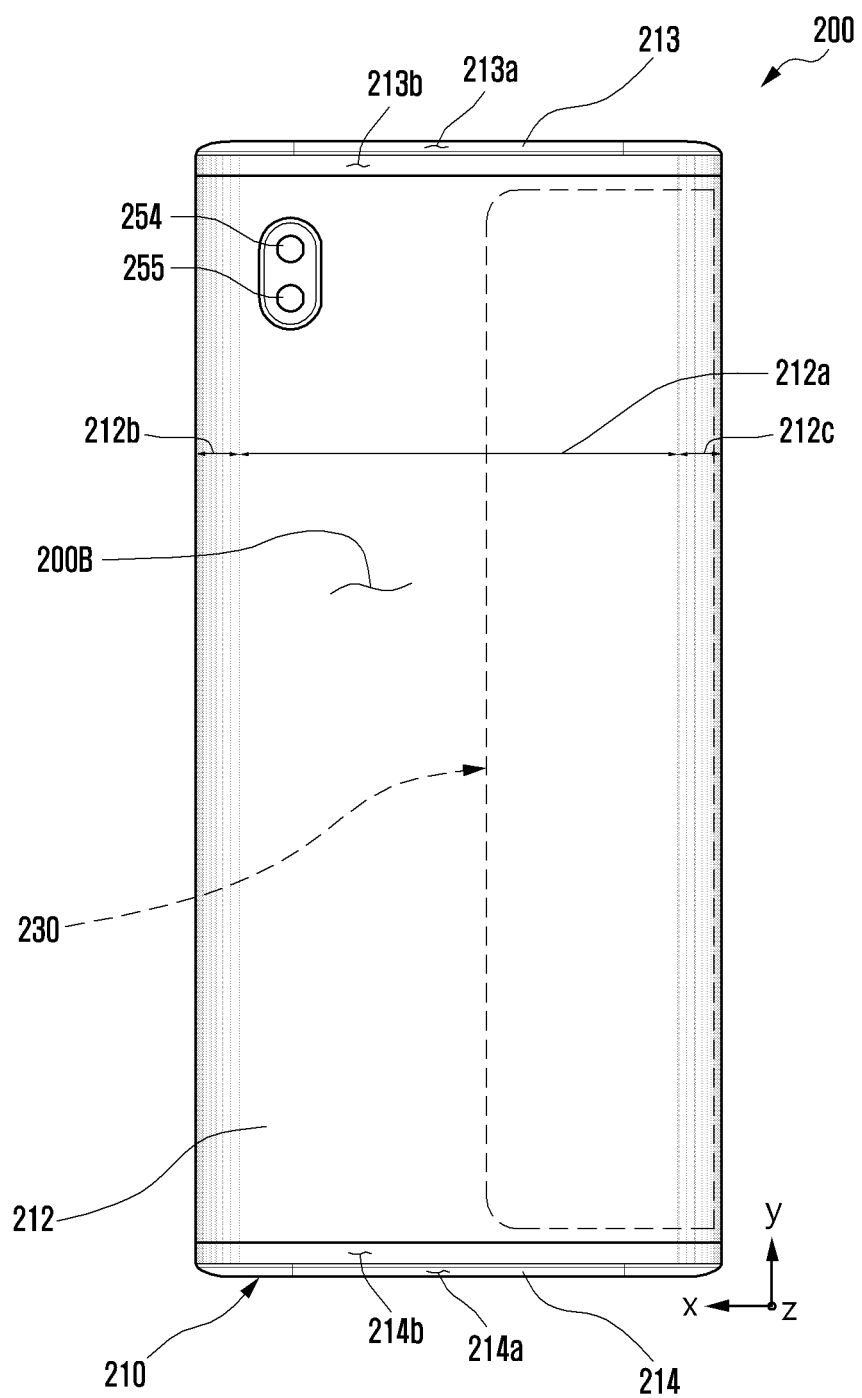
FIG. 2B is a rear perspective view of the electronic device 200 in a closed state according to various embodiments.
Figure 3A:
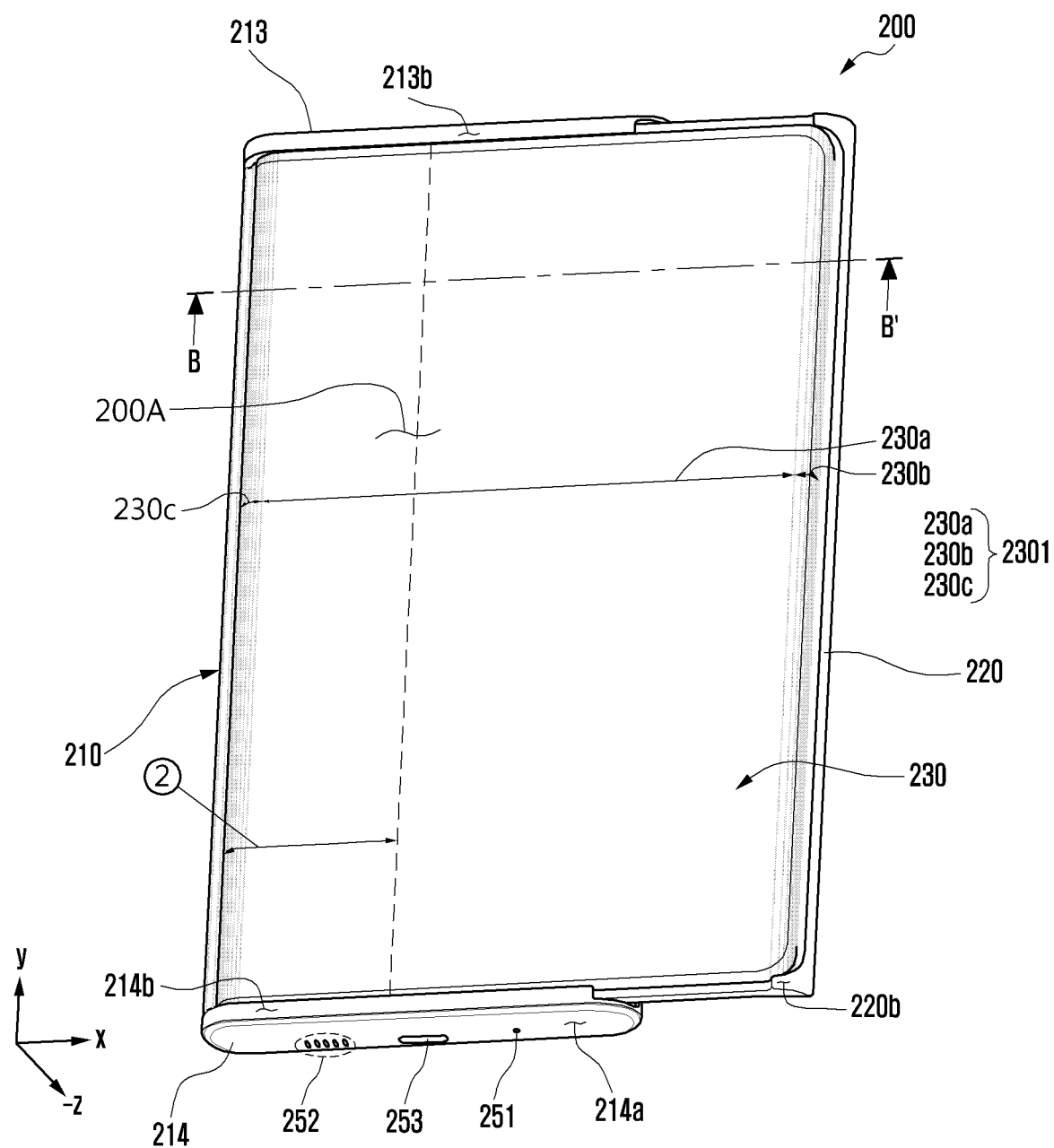
FIG. 3A is a front perspective view of the electronic device 200 in an open state according to various embodiments.
Figure 3B:
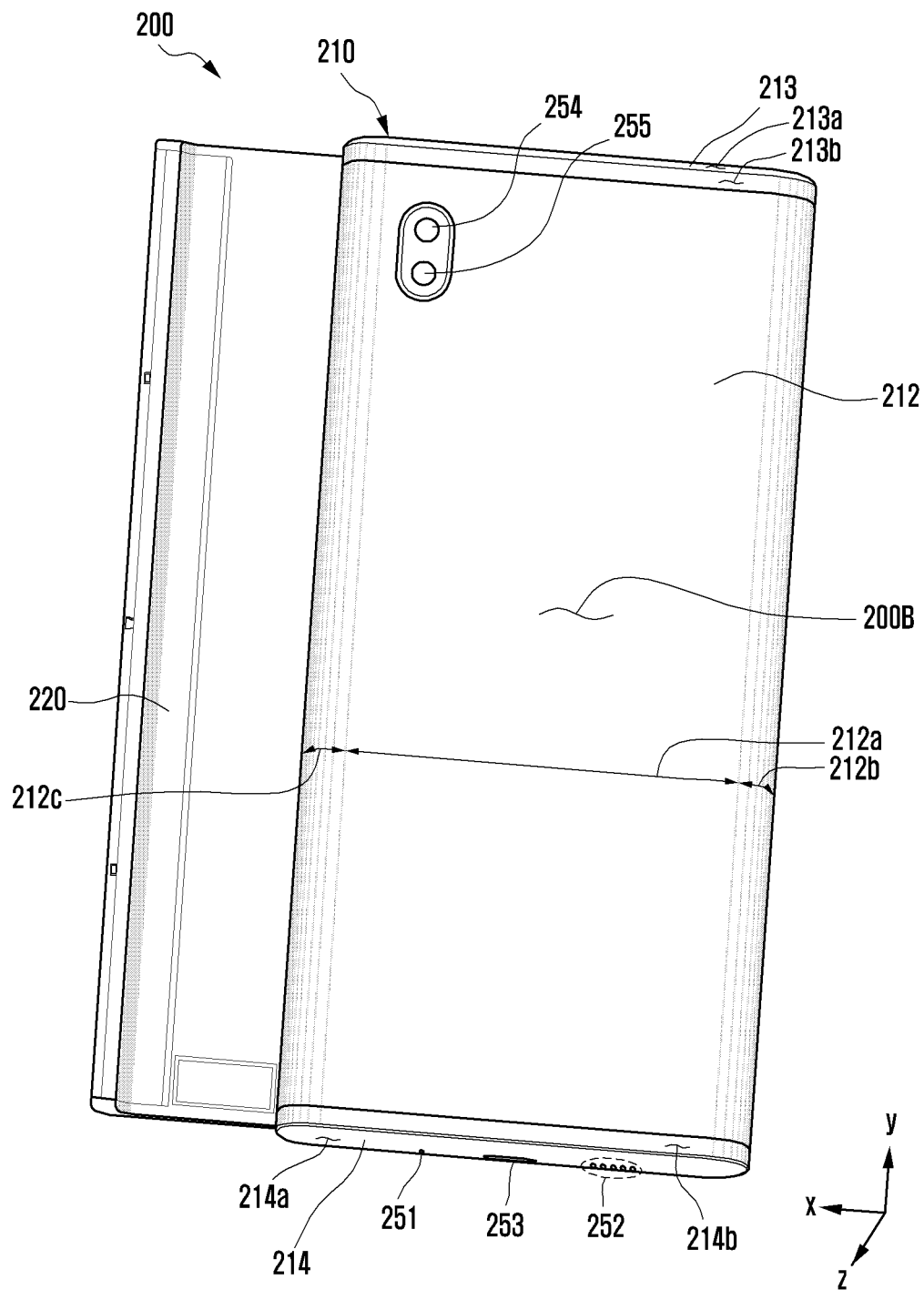
FIG. 3B is a rear perspective view of the electronic device 200 in an open state according to various embodiments.

FIG. 2A is a front perspective view of an electronic device 200 in a closed state according to various embodiments. FIG. 2B is a rear perspective view of the electronic device 200 in a closed state according to various embodiments. FIG. 3A is a front perspective view of the electronic device 200 in an open state according to various embodiments. FIG. 3B is a rear perspective view of the electronic device 200 in an open state according to various embodiments. According to an embodiment, the electronic device 200 of FIG. 2A may include an electronic device 101 of FIG. 1. According to an embodiment, FIGS. 2A and 2B illustrate the electronic device 200 in a state in which a screen 2301 thereof is not expanded. According to an embodiment, FIGS. 3A and 3B illustrate the electronic device 200 in a state in which the screen 2301 thereof is expanded.

Referring to FIGS. 2A, 2B, 3A, and 3B, according to various embodiments, the electronic device 200 may be implemented such that a screen 2301 thereof can be expanded in a sliding manner According to an embodiment, the screen 2301 may occupy an area, which is being displayed to the outside, among the entire area of a flexible display 230. According to an embodiment, the state in which the screen 2301 is not expanded is a state in which a sliding plate 220 for a sliding motion of the display 230 is not slid out and may be hereinafter referred to as a "closed state". According to an embodiment, the state in which the screen 2301 is expanded is a maximally expanded state in which the screen 2301 is no longer expanded by the slide-out of the sliding plate 220 and may be hereinafter referred to as an "open state". For example, the slide-out may include a series of operations in which the sliding plate 220 is at least partially moved in the first direction (e.g., +x axis direction) when the electronic device 200 is transitioned from the closed state to the open state. For example, the open state may refer, for example, to a state in which the screen 2301 is expanded compared to the closed state, and screens of various sizes may be provided according to a position at which the sliding plate 220 is moved. For example, an intermediate state may include a state between the closed state of FIG. 2A and the open state of FIG. 3A. According to an embodiment, the screen 2301 may include an active area (e.g., display area) of the flexible display 230 that is visually exposed (the term "visually exposed" as used herein may be used interchangeably with the term "visible") to enable an image to be output. For example, the active area of the display 230 may be adjusted based on the movement of the sliding plate 220 or the movement of the flexible display 230. According to various embodiments, the flexible display 230 that is slidably disposed on the electronic device 200 of FIG. 2A to provide the screen 2301 may also be referred to as a slide-out display or an expandable display.

According to various embodiments, the electronic device 200 may include a sliding structure related to the flexible display 230. According to an embodiment, when the flexible display 230 is moved a preconfigured distance by an external force, the electronic device 200 may be transitioned from a closed state to an open state or from the open state to the closed state without a further external force due to the elastic structure included in the sliding structure (e.g., semiautomatic slide motion).

According to various embodiments, the electronic device 200 may be transitioned from a closed state to an open state or from the open state to the closed state due to a driving device, such as a motor, connected to the flexible display 230, based on a signal received through an input device included in the electronic device 200. According to an embodiment, when an input signal by a hardware button or a software button provided through a screen is detected, the electronic device 200 may be transitioned from a closed state to an open state or from the open state to the closed state.

According to various embodiments, the electronic device 200 may be transitioned from a closed state to an open state or from the open state to the closed state, based on signals sensed through various sensors such as a pressure sensor. According to an embodiment, the electronic device 200 may detect, through at least one sensor, a squeeze gesture generated when a user holing the electronic device 200 presses a specified section of the electronic device 200 with a portion (e.g., palm or finger) of a hand. The electronic device 200 may be transitioned from a closed state to an open state or from the open state to the closed state, based on a squeeze gesture acquired through the at least one sensor.

According to various embodiments, the flexible display 230 may include a second section (see FIG. 3A). According to an embodiment, the second section may include an expanded portion of the screen 2301 when the electronic device 200 is transitioned from a closed state to an open state. For example, when the electronic device 200 is transitioned from a closed state to an open state, the second section may be slidably drawn out from the inner space of the electronic device 200. Accordingly, the screen 2301 may be expanded. According to an embodiment, when the electronic device 200 is transitioned from an open state to a closed state, at least a portion of the second section may be slidably drawn into the inner space of the electronic device 200. Accordingly, the screen 2301 may be reduced.

According to an embodiment, when the electronic device 200 is transitioned from the open state to the closed state, at least a portion of the second section may be bent and moved into the inner space of the electronic device 200. For example, the flexible display 230 may include a flexible substrate (e.g., plastic substrate) formed of a polymer material including polyimide (PI) or polyester (PET). The second section is a portion of the flexible display 230 that may be bent when the electronic device 200 is transitioned between the open state and the closed state and may also be referred to as a bendable section.

According to various embodiments, the electronic device 200 may include a housing 210, a sliding plate 220, or a flexible display 230.

According to an embodiment, the housing (or case) 210 may include a back cover 212, a first side cover 213, or a second side cover 214. The back cover 212, the first side cover 213, or the second side cover 214 may be connected to a support member (not shown) located inside the electronic device 200 and may form at least a portion of an external appearance of the electronic device 200.

According to an embodiment, the back cover 212 may form at least a portion of the back surface 200B of the electronic device 200. For example, the back cover 212 may be substantially opaque. For example, the back cover 212 may be formed of coated or colored glass, ceramic, polymer, or metal (e.g., aluminum, stainless steel (STS), or magnesium), or a combination of at least two of the above materials. According to an embodiment, in a state in which the bendable section of the flexible display 230 is drawn into the inner space of the housing 210 (e.g., closed state), at least a portion of the second section may also be disposed to be visible from the outside through the back cover 212. In this case, the back cover 212 may be formed of a transparent material and/or a translucent material.

According to an embodiment, the back cover 212 may include a flat portion 212a and curved portions 212b and 212c positioned opposite to each other with the flat portion 212a interposed therebetween. For example, the curved portions 212b and 212c may be formed adjacent to the relatively long both edges (not shown) of the back cover 212, respectively, and may be curved and seamlessly extend toward a screen located opposite to the back cover 212. According to an embodiment, the back cover 212 may include one of the curved portions 212b and 212c or may also be implemented without the curved portions 212b and 212c.

According to an embodiment, the first side cover 213 and the second side cover 214 may be positioned opposite to each other. For example, the first side cover 213 and the second side cover 214 may be positioned opposite to each other with the flexible display 230 interposed therebetween in the second direction (e.g., y axis direction) perpendicular to the first direction (e.g., +x axis direction) of the slide-out of the sliding plate 220. For example, the first side cover 213 may form at least a portion of the first side surface 213a of the electronic device 200. For example, the second side cover 214 may form at least a portion of a second side surface 214a of the electronic device 200, which is directed opposite to the first side surface 213a. For example, the first side cover 213 may include a first edge portion (or first rim) 213b extending from the edge of the first side surface 213a. For example, the first edge portion 213b may form at least a portion of a bezel at one side of the electronic device 200. For example, the second side cover 214 may include a second edge portion (or second rim) 214b extending from the edge of the second side surface 214a. For example, the second edge portion 214b may form at least a portion of the bezel at the other side of the electronic device 200.

According to various embodiments, the surface of the first edge portion 213b, the surface of the second edge portion 214b, and the surface of the sliding plate 220 may be smoothly connected in the closed state as shown in FIG. 2A, and may thus form a curved portion (not shown) on one side corresponding to a side of the first curved portion 230b of the screen 2301. According to an embodiment, the surface of the first edge portion 213b or the surface of the second edge portion 214b may include a curved portion (not shown) on the other side corresponding to a side of the second curved portion 230c of the screen 2301, which is positioned opposite to the first curved portion 230b.

According to various embodiments, the sliding plate 220 may slide on a support member (not shown) located inside the electronic device 200. According to an embodiment, at least a portion of the flexible display 230 may be disposed on the sliding plate 220. For example, the closed state of FIG. 2A or the open state of FIG. 3A may be formed based on a position of the sliding plate 220 on the support member located inside the electronic device 200. According to an embodiment, the flexible display 230 may be attached to the sliding plate 120 through an adhesive member (or stickable member) (not shown). For example, the adhesive member may include a heat-reactive adhesive member, a photoreactive adhesive member, a general adhesive, and/or a double-sided tape. According to an embodiment, the flexible display 230 may be inserted into a recess formed on the sliding plate 220 in a sliding manner to be fixedly disposed on the sliding plate 220. The sliding plate 230 may serve to support at least a portion of the flexible display 230. For example, the sliding plate 230 may also be referred to as a display support structure.

According to various embodiments, the sliding plate 220 may include a third edge portion 220b forming an outer surface (e.g., surface visible to the outside to form the external appearance of the electronic device 200) of the electronic device 200. According to an embodiment, in the closed state of FIG. 2A, the third edge portion 220b may form a bezel around a screen 2301 together with the first edge portion 213b and the second edge portion 214b. According to an embodiment, in the closed state of FIG. 2A, the third edge portion 220b may extend in the second direction (e.g., y axis direction) to connect one end of the first side cover 213 to one end of the second side cover 214. For example, in the closed state of FIG. 2A, the surface of the third edge portion 220b may be smoothly connected to the surface of the first edge portion 213b and/or the surface of the second edge portion 214b.

According to various embodiments, due to the slide-out of the sliding plate 220, at least a portion of the second section may be drawn out from the inside of the electronic device 200 such that a state in which the screen 2301 is expanded (e.g., open state) can be provided, as shown in FIG. 3A.

According to various embodiments, the screen 2301 in the closed state of FIG. 2A may include a flat portion 230a, and a first curved portion 230b and/or a second curved portion 230c which are positioned opposite to each other with the flat portion 230a interposed therebetween. According to an embodiment, the first curved portion 230b and the second curved portion 230c may be substantially symmetrical to each other with the flat portion 230a interposed therebetween. For example, in the closed state of FIG. 2A, the first curved portion 230b and/or the second curved portion 230c may be positioned to correspond to the curved portions 212b and 212c of the back cover 212, respectively, and may be curved toward the back cover 212. For example, when the closed state of FIG. 2A is transitioned to the open state of FIG. 3A, the flat portion 230a may be expanded. For example, a partial area of the second section, which forms the second curved portion 230c in the closed state of FIG. 2A, may be included in the expanded flat portion 230a and may be formed as another area of the second section when the closed state of FIG. 2A is transitioned to the open state of FIG. 3A.

According to various embodiments, the electronic device 200 may include an opening (not shown) for the drawn-in or drawn-out of the second section, and/or a pulley (not shown) positioned at the opening. According to an embodiment, the pulley may be positioned to correspond to the second section, and the movement of the second section and the moving direction thereof may be guided through rotation of the pulley in transition between the closed state of FIG. 2A and the open state of FIG. 3A. According to an embodiment, the first curved portion 230b may be formed to correspond to a curved surface formed on one surface of the sliding plate 220. According to an embodiment, the second curved portion 230c may be formed by a portion corresponding to a curved surface of the pulley in the second section. For example, the first curved portion 230c may be positioned opposite to the second curved portion 230b in the closed or open state of the electronic device 200 to improve the aesthetics of the screen 2301. According to an embodiment, the electronic device 200 may be implemented by the expanded flat portion 230a without the first curved portion 230b.

According to various embodiments, the flexible display 230 may further include a touch sensing circuit (e.g., touch sensor). According to an embodiment (not shown), the flexible display 230 may be coupled to or disposed adjacent to a pressure sensor capable of measuring the intensity (pressure) of a touch and/or a digitizer that detects a magnetic field type pen input device (e.g., stylus pen). For example, the digitizer may include a coil member disposed on a dielectric substrate so as to detect electromagnetic induction type resonance frequencies applied from a pen input device.

According to various embodiment, the electronic device 200 may include a microphone hole 251 (e.g., the input module 150 of FIG. 1), a speaker hole 252 (e.g., the sound output module 155 of FIG. 1), a connector hole 253 (e.g., the connection terminal 178 of FIG. 1), a camera module 254 (e.g., the camera module 180 of FIG. 1), or a flash 255. According to an embodiment, the flash 255 may be included in the camera module 254. In an embodiment, the electronic device 200 may omit at least one of the elements or may further include other elements.

According to an embodiment, the microphone hole 251 may be formed through at least a portion of the second side surface 214a to correspond to a microphone (not shown) located inside the electronic device 200. For example, the location of the microphone hole 251 is not limited to the embodiment of FIG. 2A and may be varied. According to an embodiment, the electronic device 200 may include a plurality of microphones capable of detecting a direction of sound.

According to an embodiment, the speaker hole 252 may be formed through at least a portion of the second side surface 214a to correspond to a speaker positioned inside the electronic device 200. For example, the position of the speaker hole 252 is not limited to the embodiment of FIG. 2A and may be varied. According to an embodiment, the electronic device 200 may include a receiver hole for talking over the telephone. In an embodiment, the microphone hole 251 and the speaker hole 252 may be implemented in one hole, or the speaker hole 252 may be omitted as in a piezo speaker.

According to an embodiment, the connector hole 253 may be formed through at least a portion of the second side surface 214a to correspond to a connector (e.g., USB connector) located inside the electronic device 200. For example, the electronic device 200 may transmit and/or receive power and/or data to and from an external electronic device electrically connected to the connector through the connector hole 253. For example, the location of the connector hole 253 is not limited to the embodiment of FIG. 2A and may be varied.

According to an embodiment, the camera module 254 and the flash 255 may be located on the rear surface 200B of the electronic device 200. For example, the camera module 254 may include one or more lenses, an image sensor, and/or an image signal processor. For example, the flash 255 may include a light emitting diode or a xenon lamp. According to an embodiment, two or more lenses (infrared camera and wide-angle and telephoto lenses) and image sensors may be located on one surface of the electronic device 200. According to an embodiment, the electronic device 200 is not limited to the embodiment of FIG. 2B or 3B and may include a plurality of camera modules. For example, the camera module 254 may be one of a plurality of camera modules. For example, the electronic device 200 may include a plurality of camera modules (e.g., dual cameras or triple cameras), each of which has different properties (e.g., angle of view) or functions. For example, a plurality of camera modules (e.g., camera module 254) including lenses having different angles of view may be provided in the electronic device 200. In this case, the electronic device 200 may control such that the angle of view of the camera module performed in the electronic device 200 is changed based on a user's selection. In addition, the plurality of camera modules may include at least one of a wide-angle camera, a telephoto camera, a color camera, a monochrome camera, or an infrared (IR) camera (e.g., time of flight (TOF) camera and structured light camera). According to an embodiment, the IR camera may operate as at least a part of a sensor module (not shown).

According to various embodiments (not shown), the electronic device 200 may further include a camera module (e.g., front camera) which generates an image signal, based on light received through one surface (e.g., front surface 200A) of the electronic device 200, placed in a direction toward which the screen 2301 is directed. According to an embodiment, the camera module 254 is not limited to the embodiment of FIG. 2B or 3B and may be aligned with an opening (e.g., through-hole or notch) formed through the flexible display 230 to be positioned inside the housing 210. For example, the camera module 254 may receive light through the opening formed through the flexible display 230 and a partial area of a transparent cover overlapping the opening formed through the flexible display 230, to generate an image signal. For example, the transparent cover may serve to protect the flexible display 230 from the outside and may include a material, such as polyimide or ultra-thin glass (UTG).

According to an embodiment, the camera module 254 may be disposed at the end of at least a portion of the screen 2301 of the flexible display 230, and may perform a related function (e.g., image capture) while the position of the camera module 254 is not visually distinguished (or visible). In this case, the camera module 254 may be disposed to overlap at least a portion of the screen 2301 when viewed from the top of the screen 2301 (e.g., viewed in the −z axis direction) so as to acquire an image of an external subject without being visible to the outside.

According to various embodiments (not shown), the electronic device 200 may further include a key input device (e.g., the input module 150 of FIG. 1). According to an embodiment, the key input device may be located on the first side surface 213a of the electronic device 200, which is formed by the first side cover 213. According to an embodiment (not shown), the key input device may include at least one sensor module.

According to various embodiments (not shown), the electronic device 200 may include various sensor modules (e.g., the sensor module 176 of FIG. 1). According to an embodiment, the sensor module may generate an electrical signal or data value corresponding to an internal operation state or an external environmental state of the electronic device 200. For example (not shown), the sensor module may include a proximity sensor which generates a signal related to approaching of an external object, based on light received through the front surface 200A of the electronic device 200, placed in the direction toward which the screen 2301 is directed. For another example (not shown), the sensor module may include various biometric sensors such as an HRM sensor or a fingerprint sensor for detecting information on a living body, based on light received through the front surface 200A or the rear surface 200B of the electronic device 200. For example, the electronic device 200 may include at least one of various other sensor modules including a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor.

According to various embodiments, the electronic device 200 is not limited to the embodiments of FIGS. 2A, 2B, 3A, and 3C and may also be implemented in a structure in which the screen is expanded from the third edge portion 220b when the sliding plate 220 is slid out. For example, a partial area of the flexible display 230, which forms the first curved portion 230b in the closed state of FIG. 2A, may be included in the flat portion 230a expanded when the closed state of FIG. 2A is transitioned to the open state of FIG. 3A, and may be formed as another area of the flexible display 230.

FIGS. 4A, 4B, 4C, 4D, 4E and 4F are diagrams illustrating example use states during a folding or unfolding operation in an electronic device according to various embodiments.

The electronic device 400 (e.g., the electronic device 101 of FIG. 1) according to various embodiments may include a foldable housing 410, a first display 430, and a second display.

According to various embodiment, the electronic device 400 may include a foldable housing 410. The foldable housing 410 may include a first housing structure 411 and a second housing structure 412 which are connected to each other by a hinge structure.

According to various embodiments, the second housing structure 412 may be connected to be foldable with respect to the first housing structure 411. The first housing structure 411 and the second housing structure 412 may be foldable with respect to each other about a folding axis 420 (e.g., the folding axis (A axis) of FIG. 2A) extending in the first direction. The first housing structure 411 and the second housing structure 412 may be disposed to face each other in a folded state.

Figure 4A:
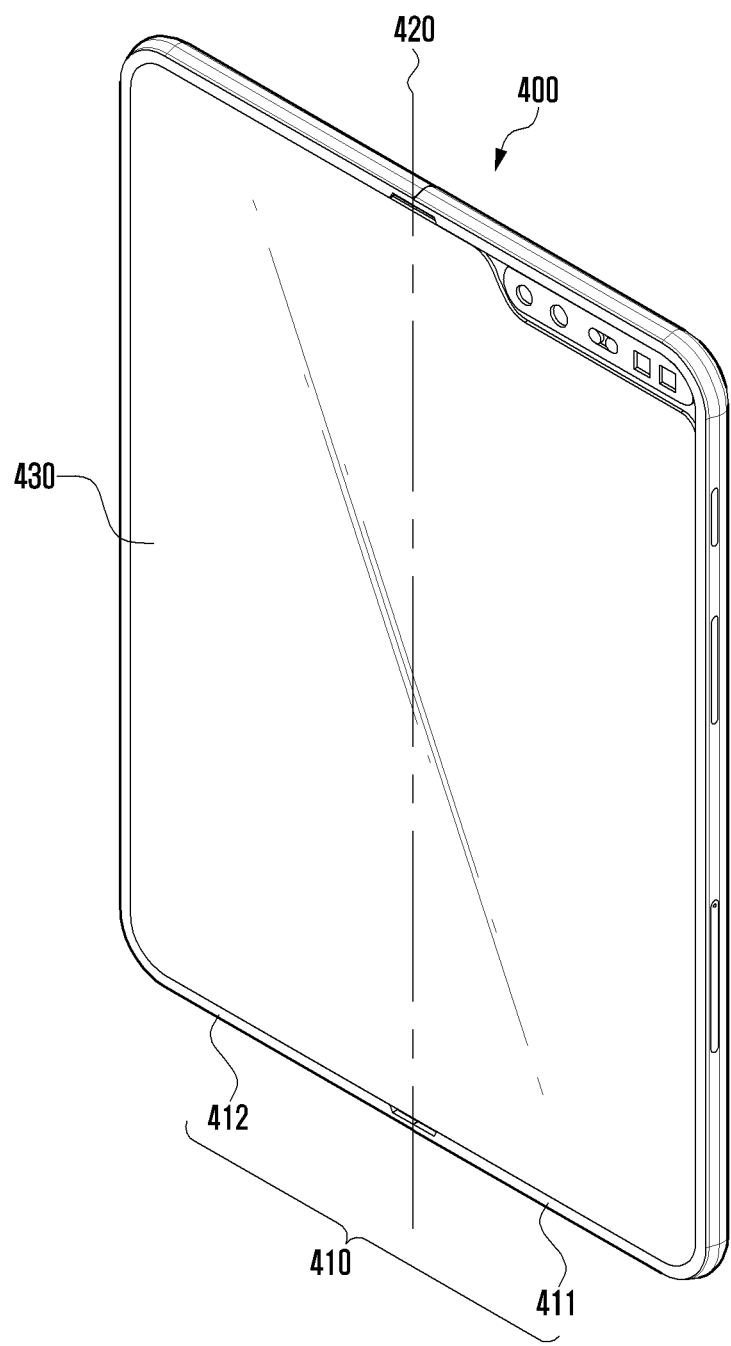
FIGS. 4A, 4B, 4C, 4D, 4E and 4F are diagrams illustrating example use states during a folding or unfolding operation in an electronic device according to various embodiments.

Referring to FIG. 4A, an angle formed between the first housing structure 411 and the second housing structure 412 may be about 180 degrees, and when the angle formed between the first housing structure 411 and the second housing structure 412 is equal to or greater than a predetermined angle (e.g., about 170 degrees), the electronic device (or the first display 430) may refer, for example, to a state in which the same is unfolded. When the electronic device 400 is in an unfolded state, the first housing structure 411 and the second housing structure 412 may form a substantially planar structure.

Figure 4B:
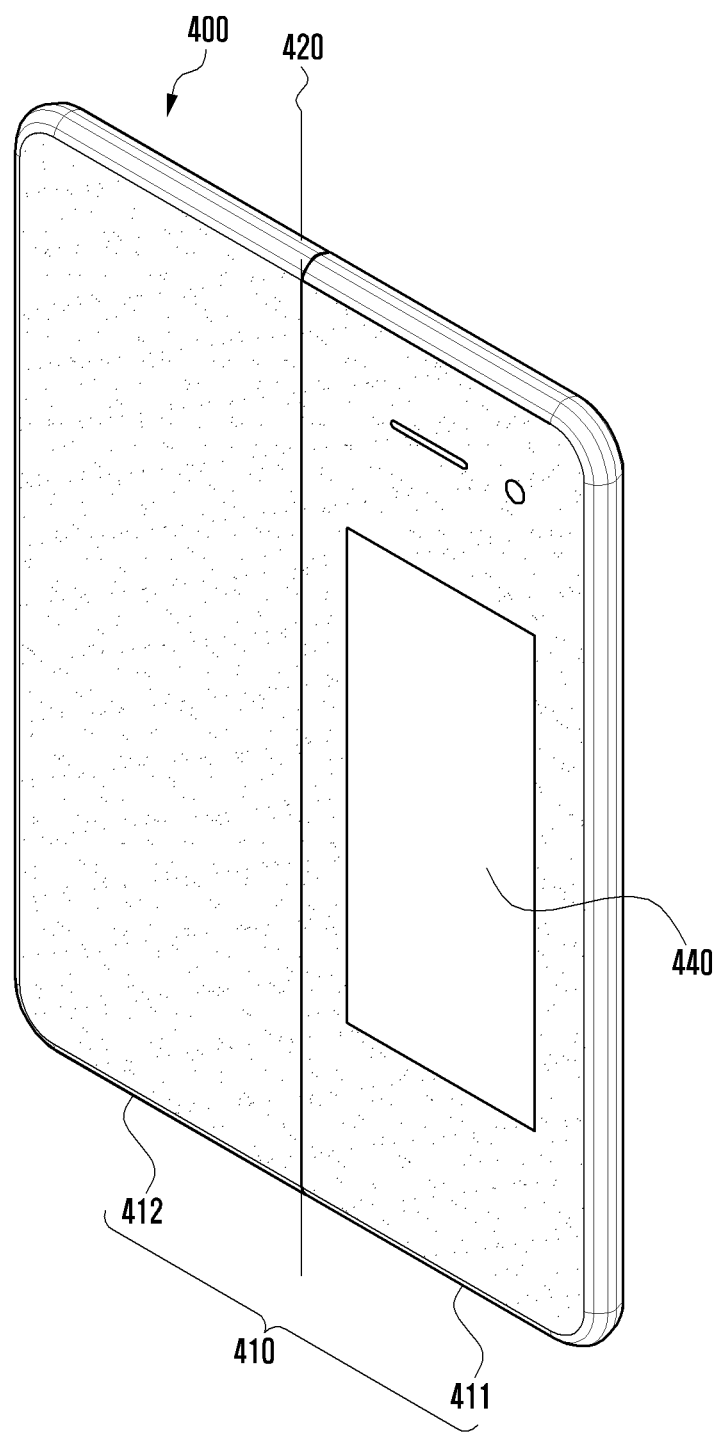

Referring to FIG. 4B, the electronic device 400 according to various embodiments may further include a second display 440.

Figure 4C:
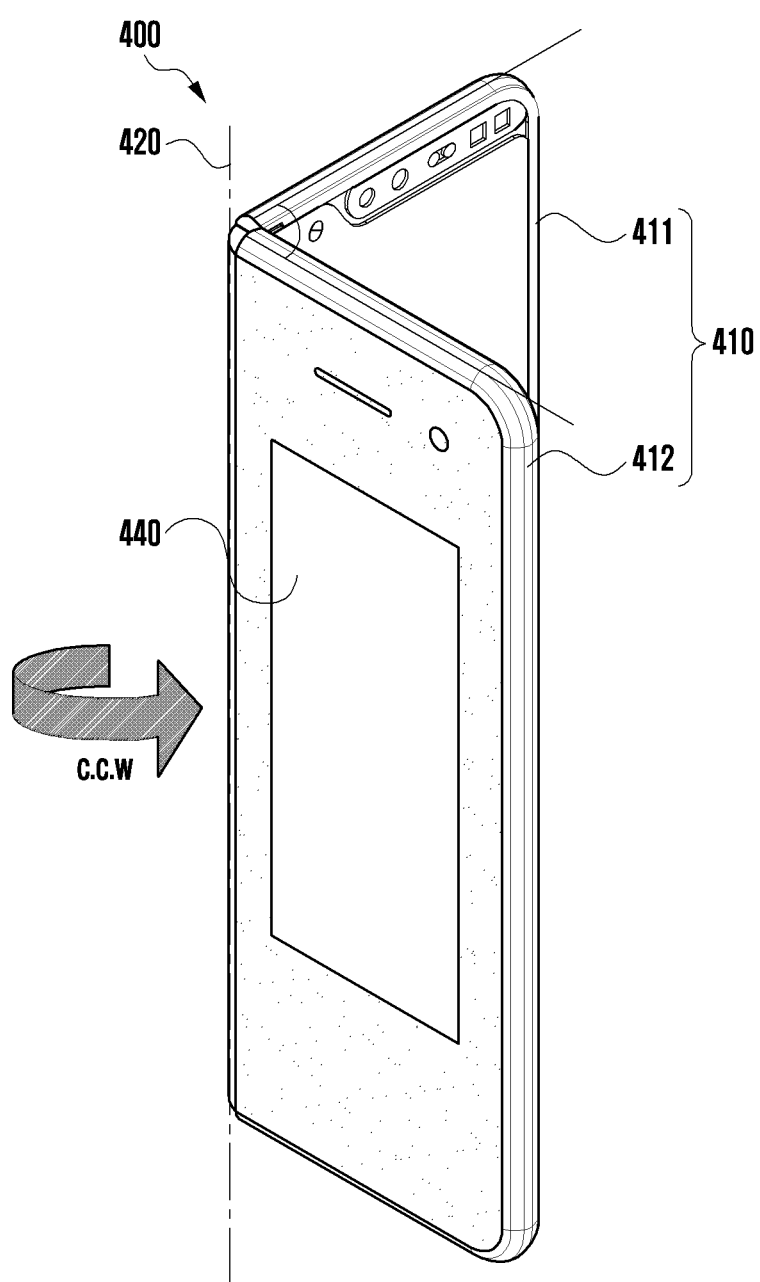
Figure 4D:
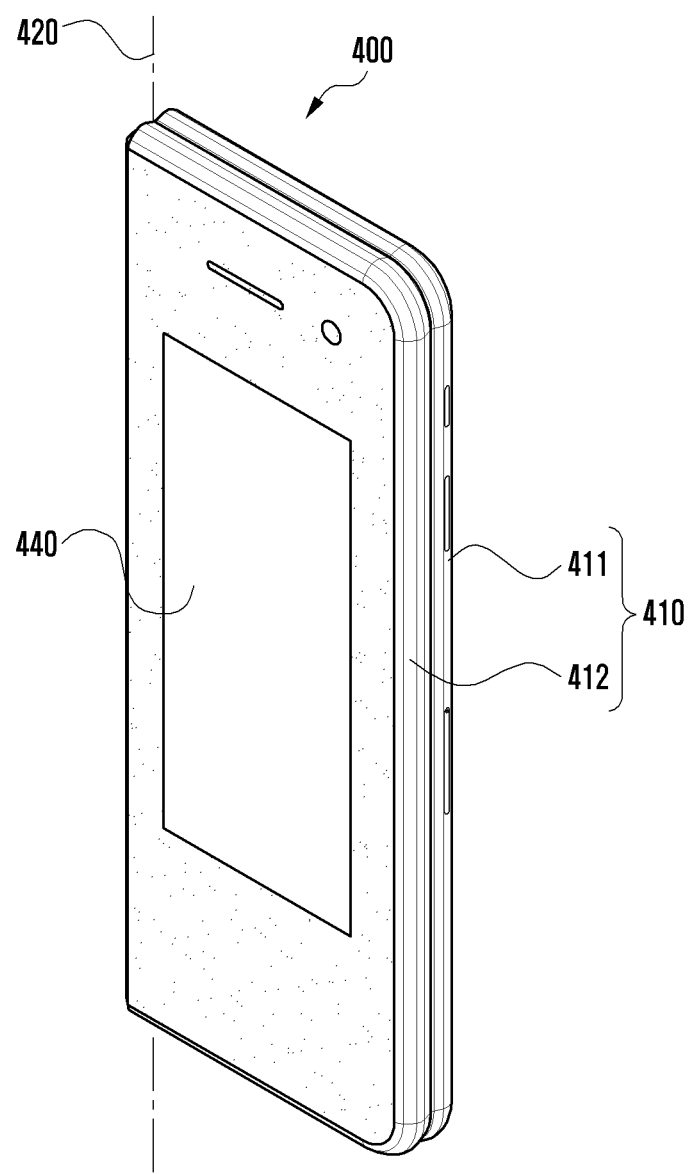

FIG. 4C illustrates a case where the electronic device 400 according to various embodiments is partially folded in a counterclockwise direction about the folding axis 420, and FIG. 4D illustrates a case where the electronic device 400 according to various embodiments is maximally folded about the folding axis 420.

Referring to FIGS. 4C and 4D, a user of the electronic device 400 may apply a force to the electronic device 400 so as to fold the electronic device 400 in an unfolded state about the folding axis 420 or unfold the electronic device 400 in a folded state about the folding axis 420.

In the electronic device 400 according to various embodiments, a user's touch may occur on the first display 430 or the second display 440 while the electronic device 400 is folded or unfolded, and such a touch input may be sensed by a touch sensor of the first display 430 or a touch sensor of the second display 440. As described above, during the change in the folding state of the electronic device 400, a touch input generated when a part of the user's finger touches the first display 430 or the second display 440 may be a user's unintended touch rather than a touch that a user actually desires to input onto the displayed screen.

Figure 4E:
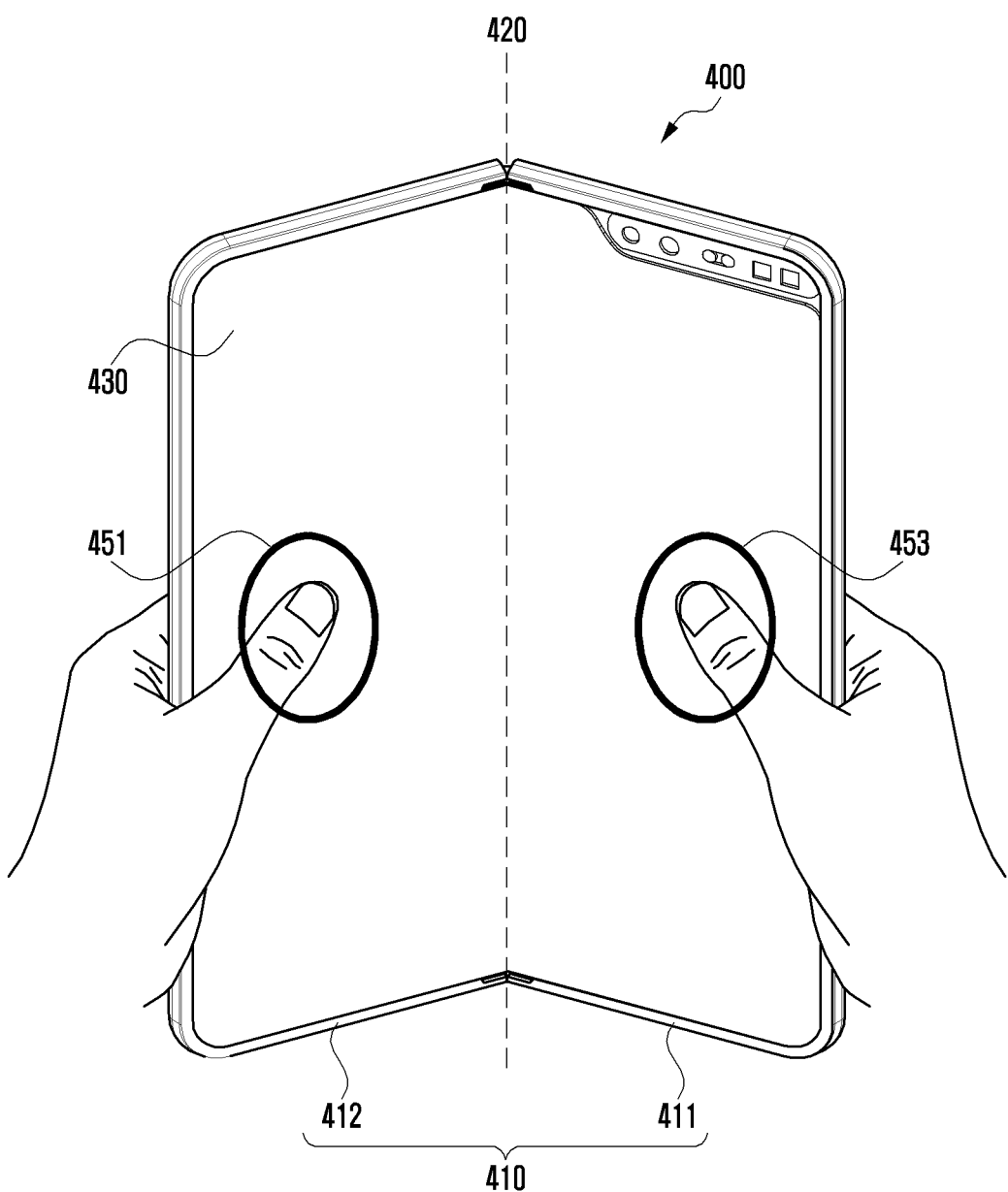

Referring to FIG. 4E, the electronic device 400 may receive a user input on the first display 430 while the electronic device 400 is folded or unfolded. For example, the electronic device 400 may receive a user input on partial areas 451 and 453 of the first display 430. A user input applied to the first display 430 while the electronic device 400 is folded or unfolded may be an unintended touch.

Figure 4F:
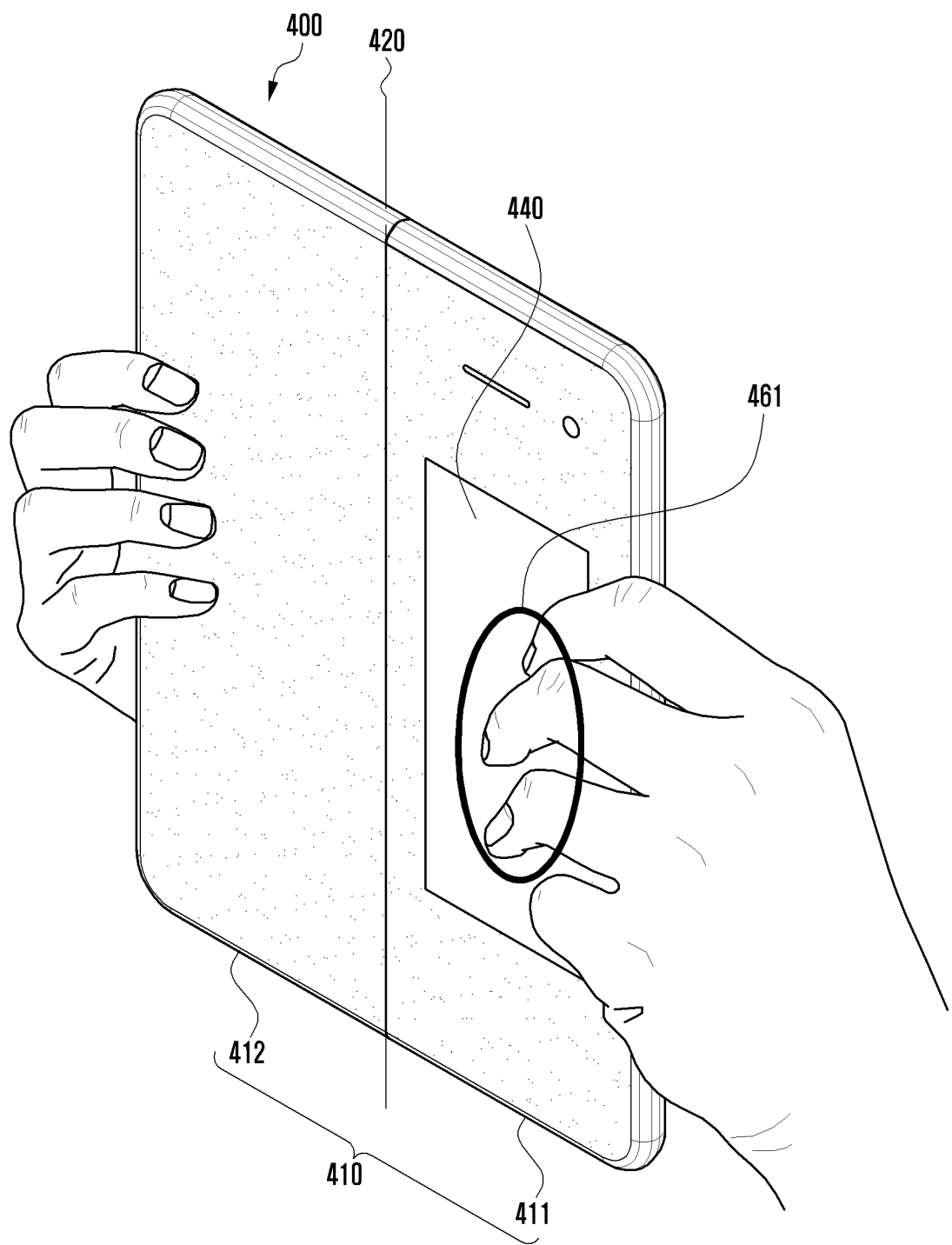

Referring to FIG. 4F, the electronic device 400 may receive a user input on the second display 440 while the electronic device 400 is folded or unfolded. For example, the electronic device 400 may receive a user input on the partial area 461 of the second display 440. A user input applied to the second display 440 while the electronic device 400 is folded or unfolded may be an unintended touch.

Figure 5A:
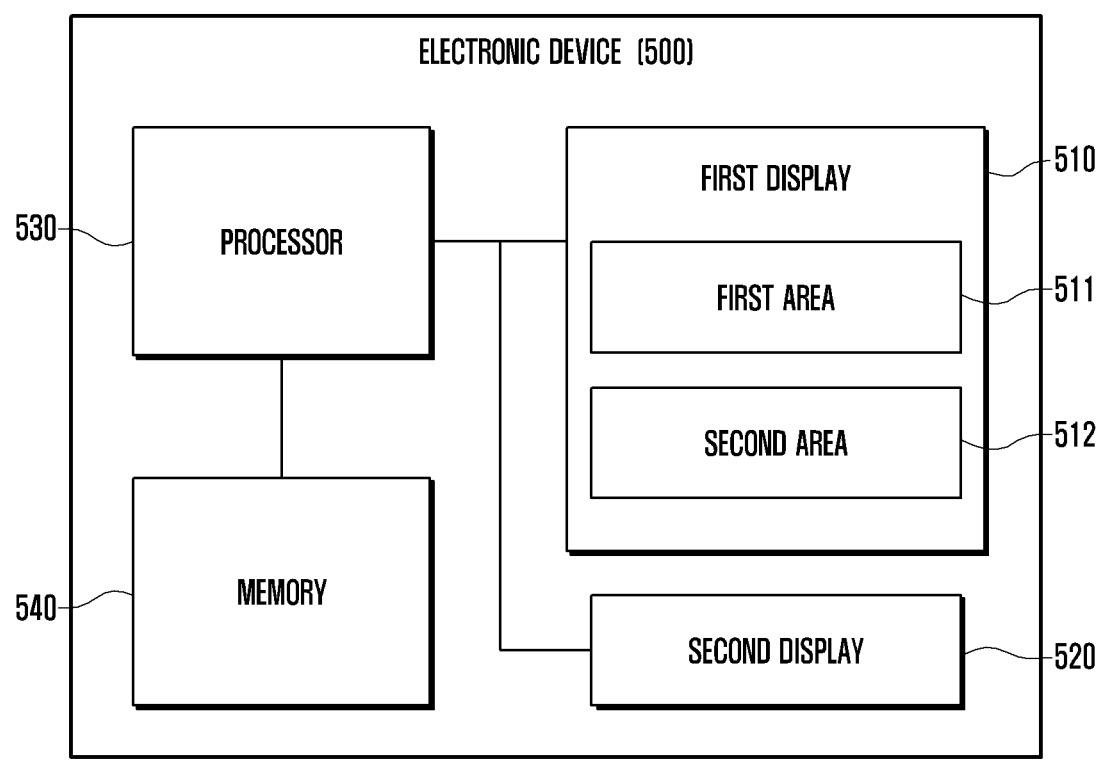
FIGS. 5A and 5B are block diagrams illustrating example configurations of an electronic device 500 according to various embodiments.
Figure 5B:
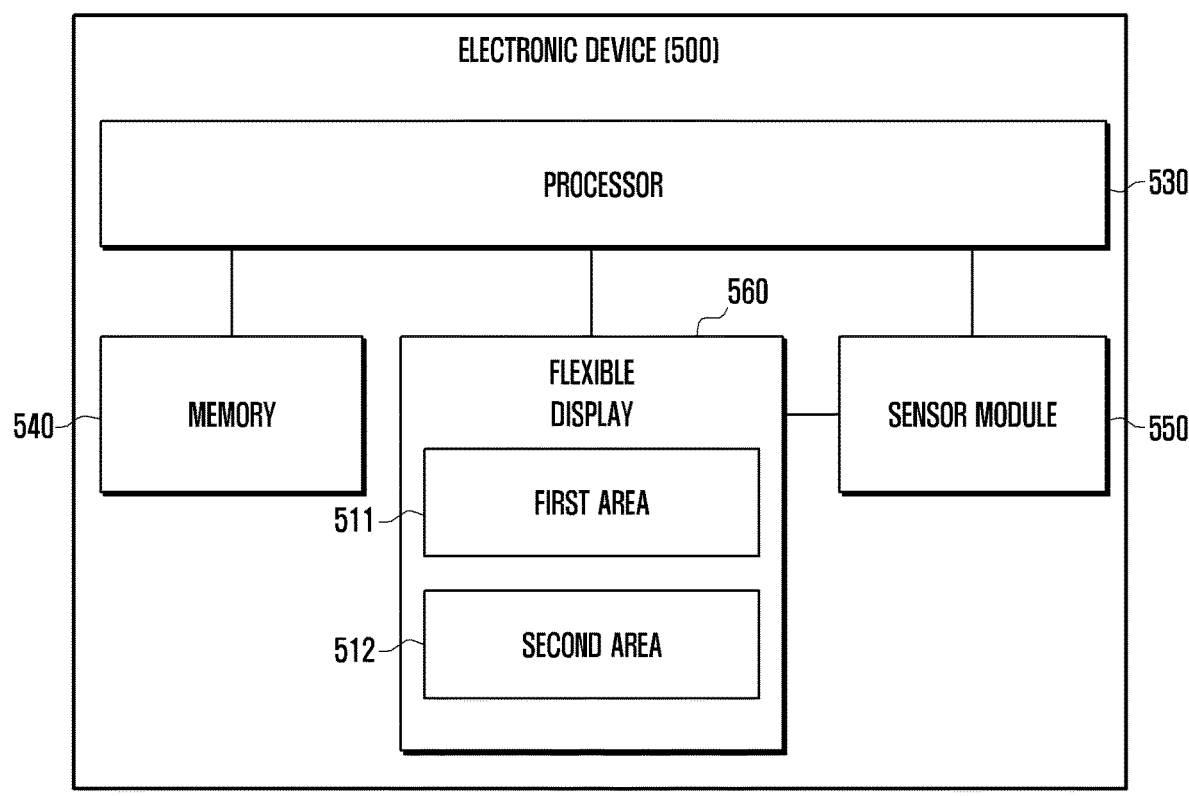

FIGS. 5A and 5B are block diagrams illustrating example configurations of the electronic device 500 according to various embodiments.

Referring to FIG. 5A, the electronic device 500 may include a first display 510, a second display 520, a processor (e.g., including processing circuitry) 530, and a memory 540, and some of the described elements may be omitted or replaced. The electronic device 500 may include at least some of the elements and/or functions of the electronic device 101 of FIG. 1. The electronic device 500 may include a foldable structure as described with reference to FIGS. 4A to 4F.

According to various embodiments, the first display 510 may be disposed on the first surface (or front surface) in the first direction of a housing of the electronic device 500. In addition, the first display 510 may be foldable. The first display 510 may be divided into a first area 511 and a second area 512, with reference to a folding area, and the first display 510 may be folded in a direction in which the first area 511 and the second area 512 face each other. Accordingly, the first display 510 may not be shown to a user in a state in which the electronic device 500 is folded.

According to various embodiments, the memory 540 may include a well-known volatile memory and non-volatile memory but is not limited thereto in specific embodiments. The memory 540 may include at least some of elements and/or functions of the memory 130 of FIG. 1. In addition, the memory 540 may store at least some of the programs 140 of FIG. 1.

The memory 540 may be functionally, operatively, and/or electrically connected to the processor 530 and may store various instructions that can be executed by the processor 530. Such instructions may include various control commands including arithmetic and logical operations, data movement, and input/output that can be recognized by the processor 530.

According to various embodiments, the processor 530, may include various processing circuitry and may be configured to be capable of performing an operation or data processing related to communication and/or control of respective elements of the electronic device 500, may include at least some of elements and/or functions of the processor 120 of FIG. 1. The processor 530 may be functionally, operatively and/or electrically connected to internal elements of the electronic device 500 including the first display 510, the second display 520, and the memory 540.

The operation and data processing functions that can be implemented in the electronic device 500 by the processor 530 are not limited, but various embodiments for processing an operation in which content being worked by a user in a state where the electronic device is folded is edited and uploaded onto an SNS when the electronic device is unfolded will be described in the disclosure. Operations of the processor 530 to be described later may be performed by loading instructions stored in the memory 540.

According to various embodiments, the processor 530 may detect the unfolding of the first display 510 through a sensor (not shown), may control such that when the first display 510 is an unfolded, first content including at least one image is displayed in the first area 511 and a user interface corresponding to at least one application and/or second content obtained by converting the first content into a form corresponding to a function provided by the at least one application is displayed in the second area 512, and may transmit, in response to a user input, data corresponding to the first content to a server connected to the at least one application. The first content may be displayed on the first area 511 and may include a static image (e.g., photo content) and a dynamic image (e.g., video content). The data transmitted to the server connected to at least one application may include second content produced by applying a user input or a filter effect to first content. In addition, the data transmitted to the server connected to at least one application may include the first content before conversion. In this case, the first content may be converted into second content through a conversion process on a server connected to at least one application and may be immediately uploaded on the server after the production. Thereafter, the produced second content may be stored in the memory 540 of the electronic device.

Referring to FIG. 5B, the electronic device 500 may include a flexible display 560, a processor (e.g., including processing circuitry) 530, a memory 540, and a sensor module (e.g., including a sensor) 550, and some of the described elements may be omitted or replaced. The electronic device 500 may include at least some of elements and/or functions of the electronic device 101 of FIG. 1. The electronic device 500 may include the structure of FIGS. 2A, 2B, 3A, and 3B.

According to various embodiments, the flexible display 560 may include a main display area and at least one expansion display area. The flexible display 560 may include at least one expansion display area expandable from the main display area in at least one of upward, downward, leftward, and rightward directions. For example, when the display 530 is in the slide-in state, only the main display area is visible to the outside to output a screen, and the expansion display area which is accommodated in the housing and thus is not visible to the outside may be in an inactive state and thus may not output a screen. When the flexible display 560 is slid out, at least a portion of the expansion display area may be visible to the outside, and the at least visible partial expansion display area may be transitioned to an active state to output a screen. Various forms of the expandable flexible display 560 have been previously described with reference to FIGS. 2A to 2B and 3A to 3B but are not limited thereto. When the flexible display 560 is slid out to be in a fully unfolded state, an application execution screen may be displayed on the entire flexible display 560. Hereinafter, an area visible to the outside when the flexible display 560 is slid in will be referred to as a first area 511. A width of the first area 511 may include a first length. When the flexible display 560 is expanded, the area occupying the first length from the left side of the expanded display will be referred to as the first area 511 and the remaining area will be referred to as a second area 512.

According to an embodiment, the electronic device 500 (e.g., the electronic device 101 of FIG. 1) may include a sensor module (e.g., the sensor module 176 of FIG. 1) including at least one sensor to determine the extent of reduction or expansion of the flexible display 560. The sensor module 550 may include, for example, and without limitation, at least one of a contact type sensor such as a touch sensor, an infrared ray (IR) sensor, a time of flight (TF) sensor, a non-contact type sensor, a magnetic force sensor, or the like. The non-contact type sensor may use an electromagnetic induction method, a capacitive method, a resistive method, or the like. The electronic device 500 may determine the expansion/reduction of the flexible display 560 and the extent thereof using the sensor measurement value using the sensor module 550. The sensor measurement value may include an error according to the mounting of an element, an error according to physical characteristics, and/or an error according to an external environment change by a user. Due to these errors, the physical size of the display derived using the sensor measurement value may not match the actual physical size of the display.

According to various embodiments, the memory 540 may include a well-known volatile memory and non-volatile memory but is not limited thereto in specific embodiments. The memory 540 may include at least some of elements and/or functions of the memory 130 of FIG. 1. In addition, the memory 540 may store at least some of the programs 140 of FIG. 1.

The memory 540 may be functionally, operatively, and/or electrically connected to the processor 530 and may store various instructions that can be executed by the processor 530. Such instructions may include various control commands including arithmetic and logical operations, data movement, and input/output that can be recognized by the processor 530.

According to various embodiments, the processor 530, may include various processing circuitry and may be configured to be capable of performing an operation or data processing related to communication and/or control of respective elements of the electronic device 500, may include at least some of elements and/or functions of the processor 120 of FIG. 1. The processor 530 may be functionally, operatively and/or electrically connected to internal elements of the electronic device 500 including the first display 510, the second display 520, and the memory 540.

The functions related to operation and data processing which can be implemented in the electronic device 500 by the processor 530 are not limited, but various embodiments for processing operations of editing contents being produced when the flexible display is unfolded and uploading the same to the SNS will be described in the disclosure. Operations of the processor 530 to be described later may be performed by loading instructions stored in the memory 540.

According to various embodiments, the processor 530 may control the electronic device 500 such that first content including at least one image is displayed in the first area 511 including a partial area of the flexible display 560 in response to a user input, may control such that a length of the flexible display slid out from the housing is measured using the sensor 550, and when the length of the flexible display 560 measured using the sensor 550 has the preconfigured first length, may determine that the electronic device 500 is in a non-expanded state, and when the length of the flexible display 560 measured using the sensor 550 has a second length relatively longer than the first length, may determine that the electronic device 500 is in an expanded state.

According to various embodiments, the processor 530 may control the electronic device 500 such that when the electronic device 500 is in an expanded state, first content is displayed in the first area 511, and a user interface corresponding to at least one application and/or second content obtained by converting the first content into a form corresponding to a function provided by the at least one application is displayed in the second area 512 including a partial area of the flexible display 560, which is slid out from the housing (not shown) to be visually exposed, and may transmit, in response to a user input, data corresponding to the first content to a server connected to the at least one application. According to various embodiments, the sensor module 550 may include some of elements and functions of the sensor module 176 of FIG. 1.

Figure 6:
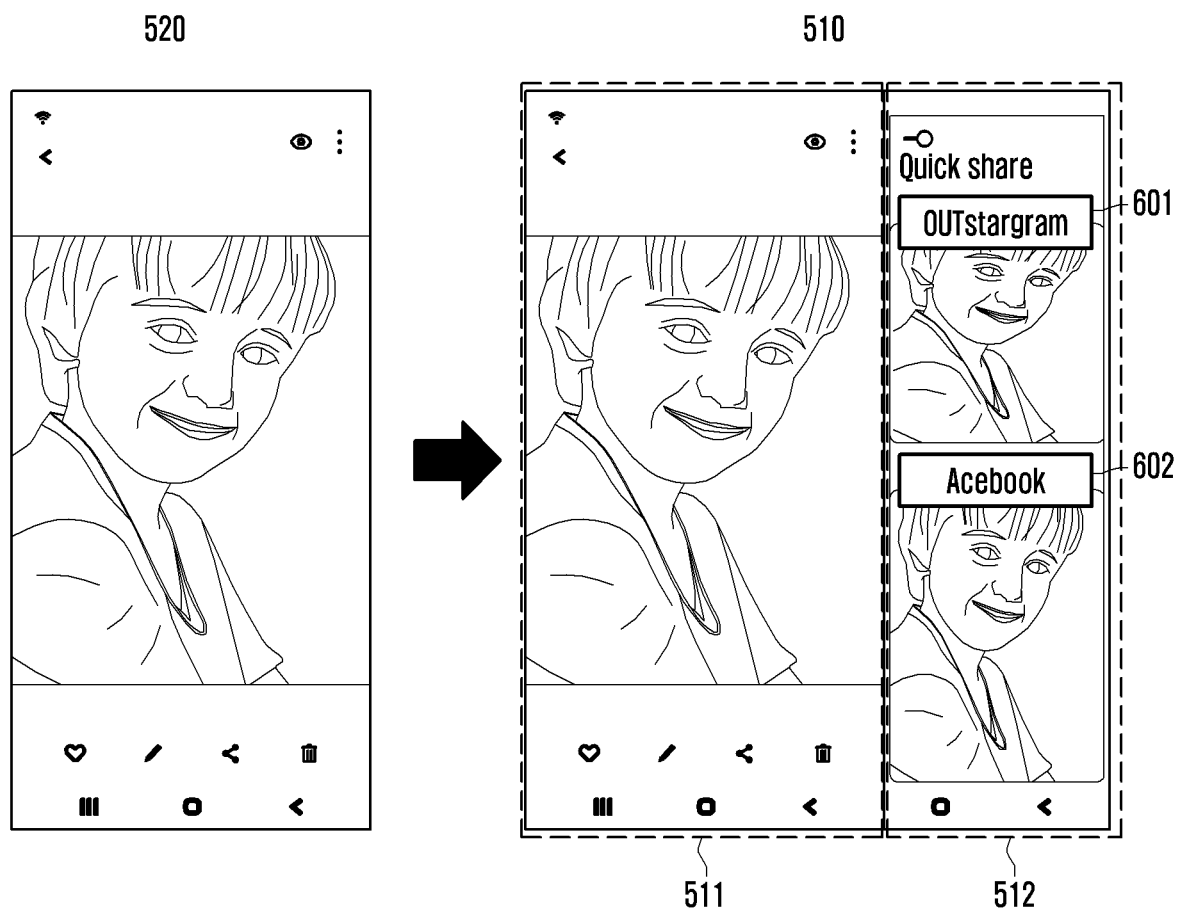
FIG. 6 is a diagram illustrating an example content screen and at least one application screen related to content when an electronic device is expanded according to various embodiments.

FIG. 6 is a diagram illustrating an example content screen and at least one application screen related to content when an electronic device is expanded according to various embodiments.

According to various embodiments, when the electronic device 500 is expanded, the processor 530 may display first content (e.g., content screen displayed on the flexible display 560 or the second display 520 before the expansion) in the first area 511. The processor 530 may additionally display second content (e.g., at least one application screen related to the first content) in the second area 512. For example, an SNS application screen related to the first content may be displayed in the second area 512. A social network service (SNS) application may refer to an application by which content can be shared, uploaded, or edited. The second area 512 may include an area generated by the expansion of the flexible display 560 or an area displayed outside while the first display area 510 of the foldable device is unfolded.

According to an embodiment, the second content may include a content preview screen to be used when the first content is uploaded to a server connected to at least one application.

FIG. 7 is a diagram illustrating an example content screen and an application screen which are synchronized with each other when the electronic device 500 is expanded according to various embodiments.

According to various embodiments, the display (e.g., the first display 510 of FIG. 5A or the flexible display 560 of FIG. 5B) including the first area 511 and the second area 512 may include a touch sensor (e.g., the sensor module 550 of FIG. 5B) capable of recognizing a touch input. The processor 530 may synchronize screens of the first area 511 and the second area 512. In this case, when a user's touch input is applied to the first area 511, the processor 530 may cause a response corresponding to the user's touch input to be shown even in the second area 512. For example, a user may provide a touch input 711 to drag two points on the display away from each other in opposite directions while touching the two points. The processor 530 may execute an operation of enlarging content in the second area 512 by the touch input 711 received on the first area 511. The processor 530 may conversely execute an operation of reducing according to a drag input. A touch input for enlarging content instead of a drag input will be described in FIG. 7.

According to various embodiments, when a touch input 711 for enlargement is applied to the first area 511, the processor 530 may enlarge and display the content on the first area 511. The application screen 601 and 602 in the second area 512 may also be synchronized with the content screen in the first area 511. In this case, the processor 530 may also enlarge and display the application screens of the second area 512. When a plurality of application screens are provided in the second area 512, the processor 530 may enlarge each of the application screens. This allows a user to process the contents at once without having to process the contents individually, thereby providing fast work speed and convenience.

According to an embodiment, a user command input to the first area 511 may include at least one of magnification enlargement, magnification reduction, or focus movement of the first content. The first content that may be displayed in the first area 511 may include a static image (e.g., photo content) and a dynamic image (e.g., video content).

FIG. 8 is a diagram illustrating an example content screen and an application screen which are synchronized with each other when the electronic device 500 is expanded according to various embodiments.

According to various embodiments, the processor 530 may recognize a touch input through a touch sensor (e.g., the sensor module 550 of FIG. 5) in FIG. 8 as in FIG. 7. For example, a user may perform a drag 811 in the first direction after touching the display. In this case, the content may move in the first direction, and the focus may move in a direction opposite to the first direction. The user may move the focus of the content screen through the drag operation 811. In addition, the moving distance of the content screen may vary in proportion to the user's drag length. Although FIG. 8 describes a case where the content is dragged in the 7 o'clock direction and moved in the 7 o'clock direction overall, the drag direction is not limited thereto.

According to various embodiments, the processor 530 may recognize the user's touch input 811 for moving content. When the touch input 811 is applied to the first area 511, the processor 530 may move the content screen in the first area 511 according to the user input. The content screen in the first area 511 and the application screens in the second area 512 may be synchronized with each other. In this case, when the content screen in the first area 511 is moved by a user input, the processor 530 may also move the application screens 601 and 602 in the second area 512 in the same direction as the content screen of the first area 511. When a plurality of application screens are provided in the second area 512, the processor 530 may move each of the application screens in the same direction. This allows the user to process the contents at once without having to process the contents individually, thereby providing fast work speed and convenience.

According to an embodiment, a user command input to the first area 511 may include at least one of magnification enlargement, magnification reduction, or focus movement of the first content. The first content that can be displayed in the first area may include a static image (e.g., photo content) and a dynamic image (e.g., video content).

Figure 9:
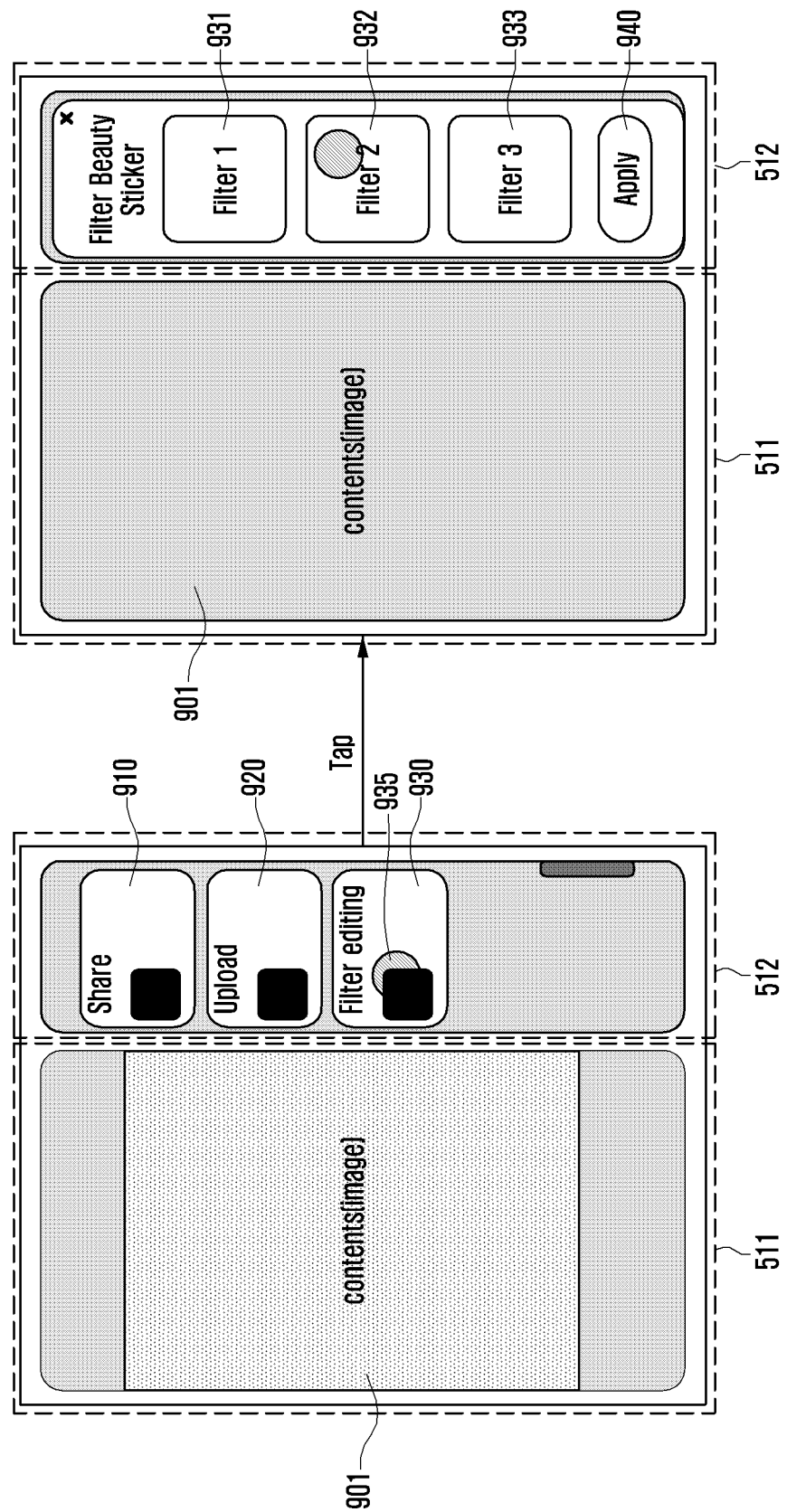
FIG. 9 is a diagram illustrating an example content screen and a guide screen of an SNS application related to a filter effect, in the electronic device 500 according to various embodiments.

FIG. 9 is a diagram illustrating an example content screen and a guide screen related to a filter effect of an SNS application, in the electronic device 500 according to various embodiments.

According to an embodiment, the processor (e.g., the processor 530 of FIG. 5A) may provide a guide screen 1210, 1220, 1230 and 1240 (refer to FIG. 12) listing filter effects related to the first content to the second area 512, may determine a filter effect to be applied to the first content according to a user input to the guide screen 1210 to 1240, and may produce second content by applying the filter effect and/or a user command to the first content. The first content that can be displayed in the first area may include a static image (e.g., photo content) and a dynamic image (e.g., video content). The second content may refer to content newly generated by applying a filter effect and/or a user command to the first content.

According to an embodiment, a content screen 901 may be displayed in the first area 511 of the electronic device 500. The processor 530 may provide guide screens 910, 920 and 930 related to SNS applications to the second area 512 when the electronic device 500 is expanded. The guide screens 910 to 930 may include icons representing sharing, uploading, and filtering of content screens. As mentioned above, the display in the second area 512 may include a touch sensor (e.g., the sensor module 550 of FIG. 5). When a user's touch input is applied to the guide screen, the processor 530 may recognize the touch input and display a guide screen related to the touched icon. A case where a touch input 935 is generated on an icon 930 representing a filtering operation is described in FIG. 9, but the disclosure is not limited thereto, and a guide screen to be displayed may vary according to the type of application and/or a user's icon selection.

According to an embodiment, the processor 530 may recognize a user's touch input 935 applied to a filtering operation icon 930. The processor 530 may receive the filter effects 931, 932 and 933 provided by the corresponding SNS application in advance and display the same on the guide screen. In addition, these effects may be applied 940 to the content screen. A user can select an effect to be applied to the content screen according to his or her preference among various filter effects. Through this, the filter effects of SNS applications may be applied 940 in advance inside the electronic device 500 rather than on the SNS application. The filter effect provided on the electronic device 500 or the application may include, for example, an artistic for producing a picturesque effect, a blur for blurring focus of an image, a distort for changing a shape of an image into a new image, a render for adding a lighting-related effect, a sharpen for sharpening an image, or an effect for applying a special treatment to a background format or providing a texture feeling to a surface.

According to an embodiment, at least one application may include at least one social networking service (SNS) application. In addition, the at least one application may provide, onto the second area 512, a guide screen for a function corresponding to at least one of a function for converting a format of the first content, a function for applying a graphic effect to the first content, a function for changing a enlargement magnification of the first content, a function for changing a ratio of the first content, a function for changing a resolution of the first content, or a function for adjusting a size of the first content. The graphic effect may include an image filter effect provided by the at least one application. The graphic effect may refer to an effect of causing an original image to visually look different through edition on at least a part of the original image according to a filter type. The graphical effect may include, for example, a blur for blurring the periphery of an image, a sharpen for changing a sharpness of an image, a black and white filter for changing a color image into a black and white image, and an edge effect for accentuating an edge, but is not limited thereto. In addition, the graphic effect may further include an animation effect for changing or animating at least a part of an original image or an effect for shining a specific object in an image. The electronic device 500 may load software stored in at least one of the internal memory 540, at least one application, or a server connected to the application, or download software from the outside to use the same. In this case, the software may refer to software defining the above-mentioned filter effect or graphic effect.

According to an embodiment, the processor 530 may provide a guide screen listing filter effects related to the first content to the second area 512, may determine a filter effect to be applied to the first content according to a user input to the guide screen, and may produce second content by applying a filter effect and/or a user input to the first content.

Figure 10:
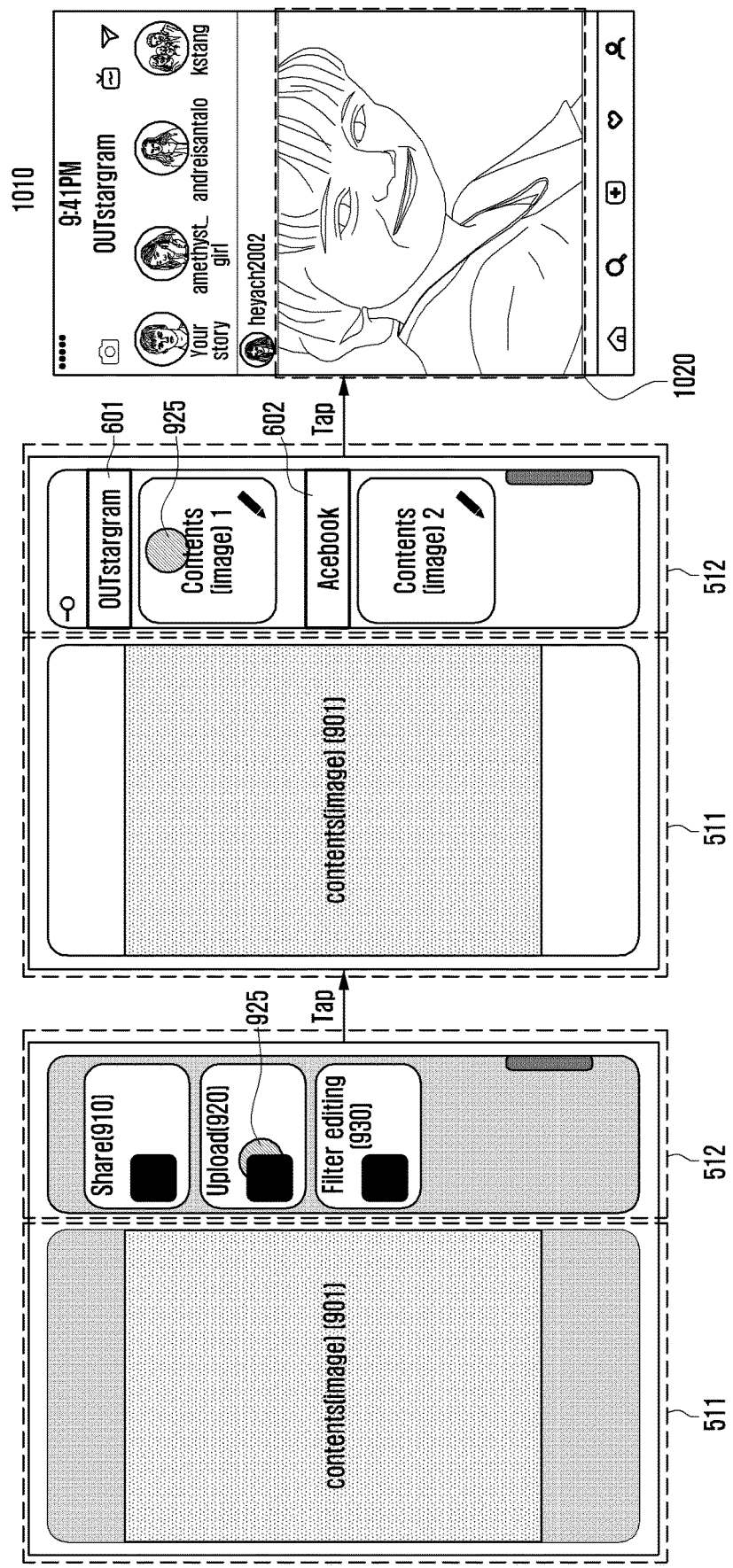
FIG. 10 is a diagram illustrating an example content screen and a guide screen of an SNS application related to uploading, in the electronic device 500 according to various embodiments.

FIG. 10 is a diagram illustrating an example content screen and a guide screen of an SNS application related to uploading, in the electronic device 500 according to various embodiments.

According to an embodiment, the processor (e.g., the processor 530 of FIG. 5A) may provide a guide screen related to uploading of second content to a user and may upload the second content to a server of at least one application. The second content may refer to content newly generated by applying a filter effect and/or a user command to the first content. In addition, the first content may include a static image (e.g., photo content) and a dynamic image (e.g., video content). The second content may include content obtained by converting the first content, for example, a preview screen of the first content uploaded to at least one application.

According to an embodiment, the at least one application may include at least one social networking service (SNS) application.

According to an embodiment, the processor 530 may provide guide screens 910 to 930 related to the SNS application to the second area 512 as in FIG. 9 when the electronic device 500 is expanded. The guide screen may include icons representing sharing 910, uploading 920, and filtering operation 930 of the content screen. As mentioned above, the display in the second area 512 may include a touch sensor (not shown). When a user's touch input is applied to the guide screen, the processor 530 may recognize the touch input and display a guide screen related to the touched icon. FIG. 10 illustrates a case where a touch input 925 is generated on an icon 920 related to SNS upload.

According to an embodiment, when a touch input 925 is generated on the icon 920 related to SNS upload, the processor 530 may recognize the touch input 925 and may display at least one SNS application screen 601 and/or 602 in the second area 512. The type, number, and arrangement of the application screens may be preconfigured by a user. For example, when the upload icon 920 is touched in a case of two applications 601 and 602 configured by a user, the processor 530 may provide the two preconfigured application screens 601 and 602 in the second area 512. In addition, when the user's touch input 925 is generated on a part of the two application screens, the processor 530 may detect the user's touch input 925 and may upload a content screen 1020 to the corresponding application 601. The description with reference to FIG. 10 is based on an assumption of a case of the two preconfigured application screens 601 and 602, but the type and number of applications to be displayed may not be limited thereto.

According to an embodiment, when a user's touch input is applied to the application screen, the processor 530 may recognize the touch input and may upload the content 1020 to which the filter effect as described in FIG. 9 above has been applied on an SNS application. Through the expansion of the electronic device 500, a user may simultaneously utilize the SNS application used before the expansion and other applications installed inside the electronic device 500. This enables a user to reduce the hassle of turning on and off SNS applications and to perform editing (e.g., applying filter effects, moving focus, changing magnification, etc.), uploading, and sharing more conveniently.

According to an embodiment, the processor 530 may convert the first content into a form corresponding to a function provided by the at least one application and may transmit the converted first content to a server connected to the at least one application.

According to an embodiment, the processor 530 may control such that a guide screen related to uploading of second content generated by applying a filter effect and/or a user input (e.g., enlargement, reduction, focus movement) to the first content is provided to a user and the second content is uploaded to a server of at least one application.

Figure 11:
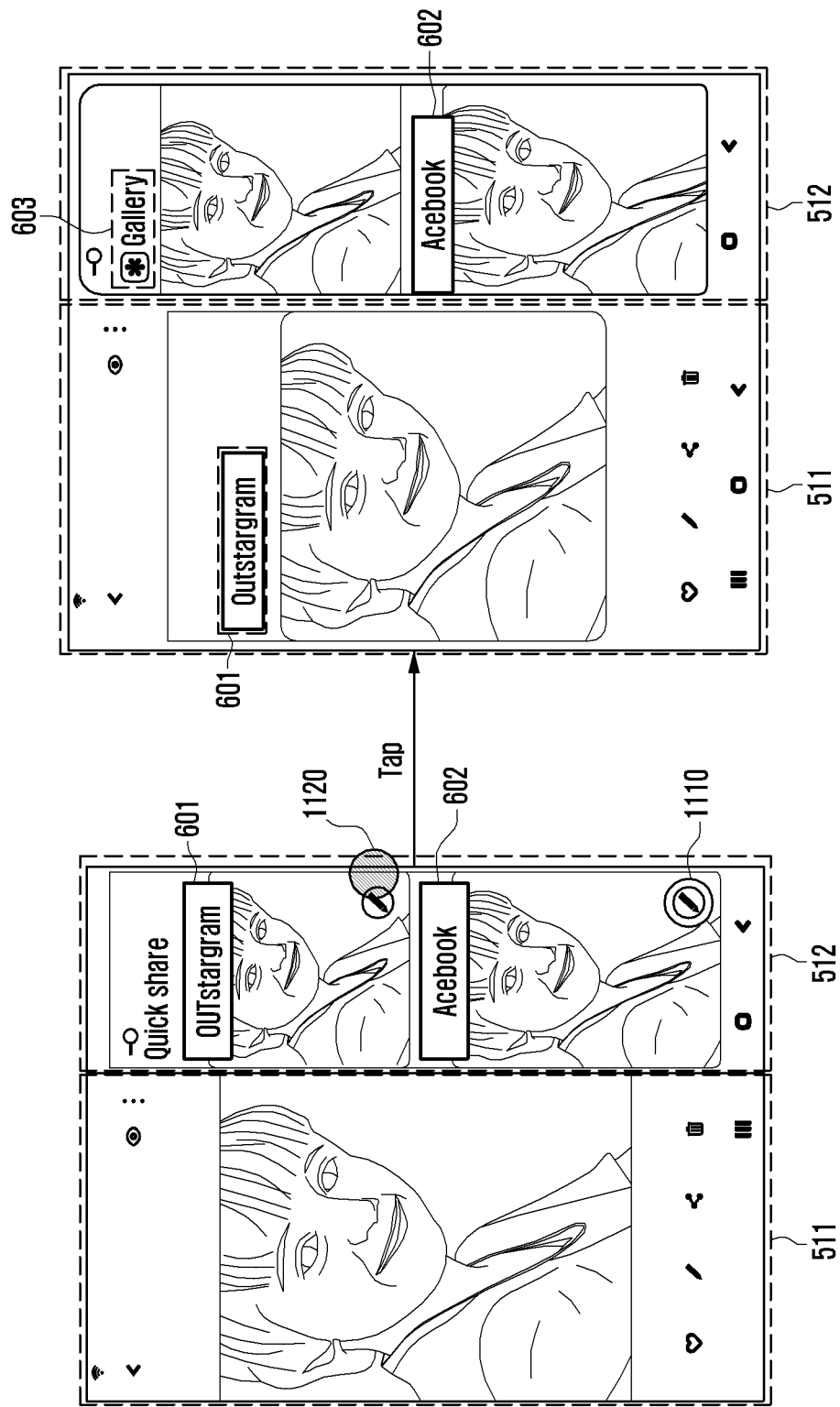
FIG. 11 is a diagram illustrating an example in which a position of an application screen is swapped with that of a content screen in the electronic device 500 according to various embodiments.

FIG. 11 is a diagram illustrating an example in which a position of an application screen is swapped with that of a content screen in the electronic device 500 according to various embodiments.

According to an embodiment, the processor (e.g., the processor 530 of FIG. 5A) may further display a swap-related icon 1110 and 1120 on at least one application screen 601 and 602 related to the second content. In addition, when a user's touch input is applied to the swap-related icon 1110 and 1120, the processor 530 may swap a position of the application screen 601 and 602 in the second area 512 with that of the first content in the first area 511. For example, when a user's touch input is sensed from a swap-related icon on the application screen 601 of the second area 512, the processor 530 may swap the application screen 601 in the second area 512 with the first content in the first area 511.

According to an embodiment, the processor 530 may receive a user command input to the first area 511 and may equally control the application screen 601 swapped according to the user command and the at least one application screen 602 and 603 displayed in the second area 512.

According to an embodiment, the user command input to the application screen 601 or 602 including the swap-related icon 1110 and 1120 may include at least one of magnification enlargement, magnification reduction, or focus movement of content.

According to various embodiments, the processor 530 may display the application screens 601 and 602 related to the content in the second area 512 according to the expansion of the electronic device 500. The processor 530 may further display the swap-related icon 1110 on at least one application screen 601 and/or 602 related to content. When the touch input 1120 is applied to the swap-related icon 1110, the processor 530 may swap the position of the at least one application screen 601 and 602 related to the content with that of the content screen 603. A user can edit the content more efficiently by adjusting the screen position through the swap.

According to various embodiments, the processor 530 may synchronize the first content screen 601 and the second content screen 602 and 603 even when the position of the second content screen (e.g., at least one application related to the first content) in the second area 512 is swapped with that of the first content screen in the first area 511. Here, the first content may include a static image (e.g., photo content) and a dynamic image (e.g., video content). In addition, the second content may include content obtained by converting the first content, for example, a preview screen of the first content uploaded to the at least one application. In this case, the processor 530 may receive a user command input to the second content screen 601 swapped onto the first area 511 and may equally control the second content screen 601 and the first content screen 602 and 603 swapped onto the second area 512 even without a special touch input applied to the first content screen 602 and 603. For example, when the touch input related to expansion/reduction or movement mentioned in FIGS. 7 to 8 above is generated on the second content screen 601 in the first area 511, the processor 530 may control such that the first content screen 602 and 603 in the second area 512 is also expanded/reduced or moved.

Figure 12:
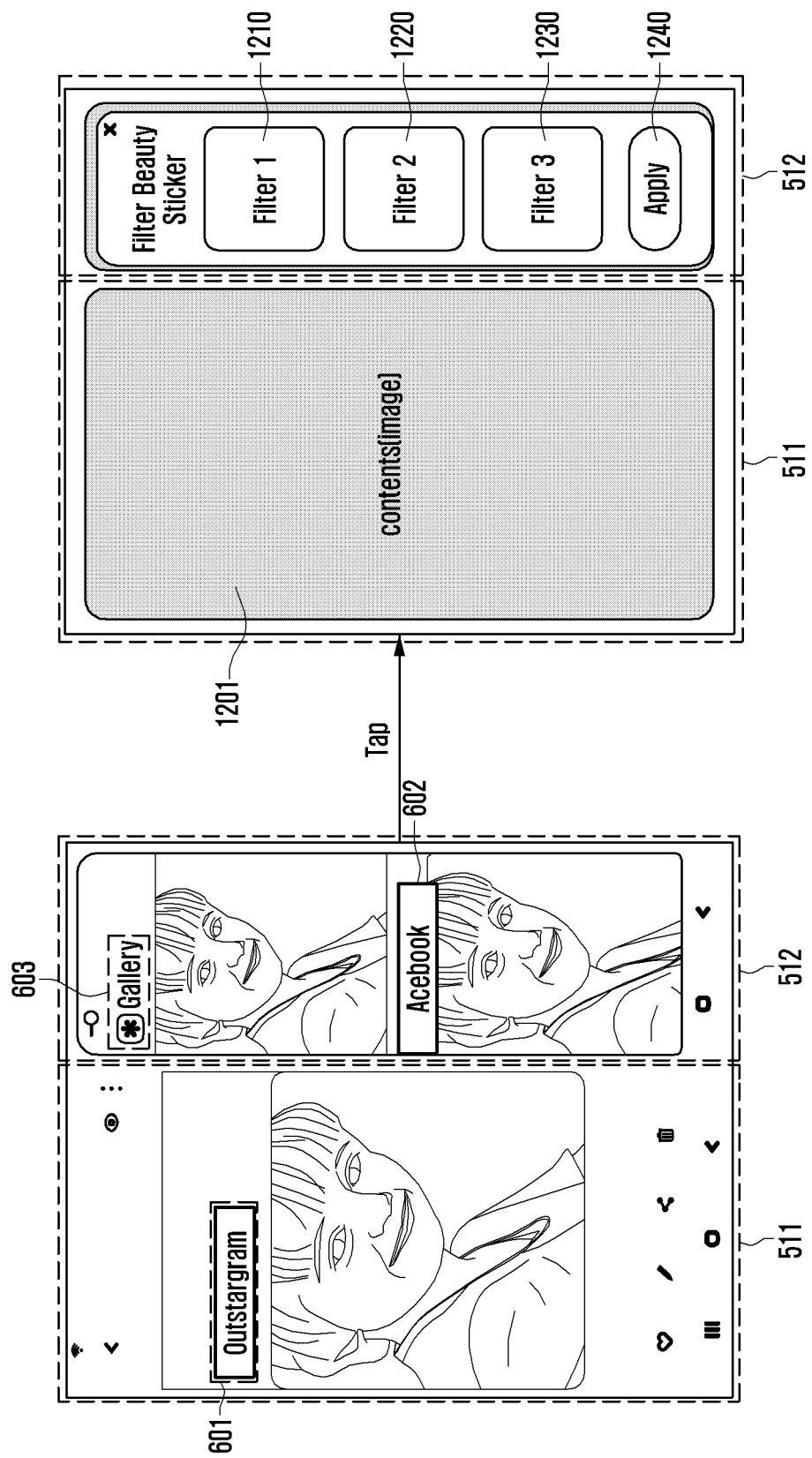
FIG. 12 is a diagram illustrating an example in which the electronic device 500 provides a filter effect after the position of the application screen is swapped with that of the content screen according to various embodiments.

FIG. 12 is a diagram illustrating an example in which the electronic device 500 provides a filter effect after the position of the application screen is swapped with that of the content screen according to various embodiments.

Referring to FIG. 11 above, the position of the content screen in the first area 511 and the position of the application screen in the second area 512 may be swapped with each other. In this case, at least one application screen may be positioned in the second area 512 and the number of application screens may vary according to a user's settings. Hereinafter, the description is based on an assumption of a case where two application screens (e.g., the first application screen 601 and the second application screen 602 of FIG. 6) are positioned in the second area 512, but the number of application screens is not limited to two and may vary according to user's settings.

According to various embodiments, the processor 530 may provide, in the second area 512, a guide screen 1210, 1220, 1230 and 1240 listing filter effects of the application instead of the content screen 602 or 603. In addition, the processor 530 may apply a filter effect to an application screen 1201 according to a user input to the guide screen 1210 to 1240. In this case, the filter effect may be an effect provided by the SNS application 601. For example, when the content screen is swapped with the first application screen 601, the processor 530 may display the second application screen 602 and the content screen 603 together in the second area 512. In addition, the processor 530 may display, in the second area 512, the guide screen 1210 to 1240 listing the filter effects to be applied to the first application screen 601 instead of the second application screen 602 and the content screen 603. The filter effect may be an effect provided by the first application or an effect provided by the second application. In this case, a user may edit the content by utilizing various filter effects 1210 to 1230. The processor 530 may provide more various filter effects as the number of SNS applications configured to be displayed in the second area 512 or pre-installed in the electronic device 500 increases. The filter effect that may be provided on the electronic device 500 or the SNS application has been described above with reference to FIG. 9.

According to an embodiment, the processor (e.g., the processor 530 of FIG. 5A) may provide, in the second area 512, the guide screen 1210 to 1240 listing filter effects related to the first content, may determine a filter effect to be applied to the application screen 601 or 602 including a swap-related icon (e.g., the swap-related icon 1110 or 1120 of FIG. 11) according to a user input to the guide screen 1210 to 1240, and may produce second content by applying a filter effect and/or a user command to the application screen 601 or 602 including a swap-related icon. The second content may refer to content newly produced by applying a filter effect and/or a user command to the first content.

According to an embodiment, the processor 530 may provide a guide screen related to uploading of the second content to a user and may upload the second content to a server of at least one application.

Figure 13A:
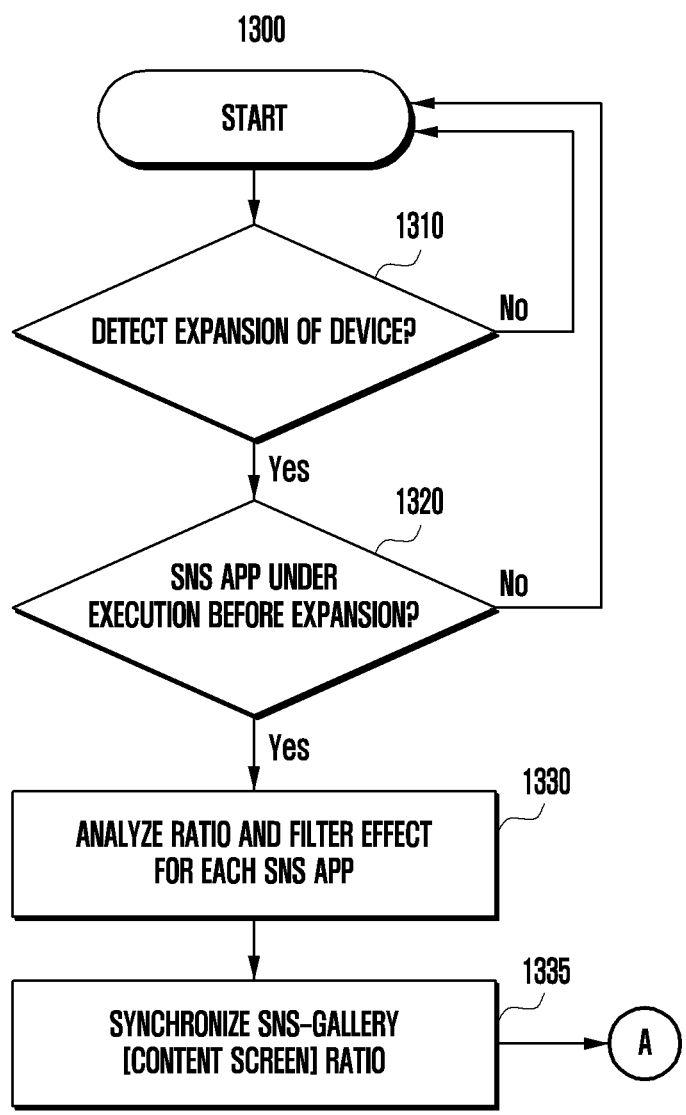
FIGS. 13A and 13B are flowcharts illustrating an example method for providing content by the electronic device 500 according to various embodiments.
Figure 13B:
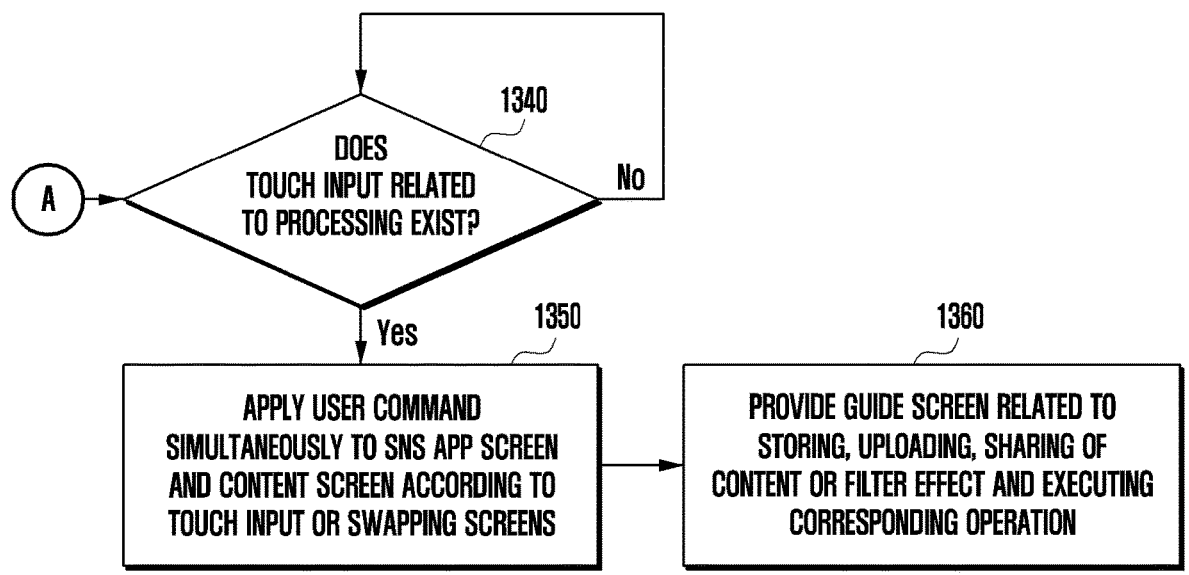

FIGS. 13A and 13B are flowcharts illustrating an example method for providing content by an electronic device according to various embodiments.

The described content providing method 1300 may be executed through the electronic device (e.g., the electronic device 500 of FIG. 5A) described above with reference to FIGS. 1 to 12, and the technical features described above may not be repeated below.

The method for providing content by the electronic device 500 according to various embodiments may include an operation of controlling such that first content including at least one image is displayed in a first area (e.g., the first area 511 of FIG. 5B) including a partial area of a flexible display (e.g., the flexible display 560 of FIG. 5B) in response to a user input, an operation of measuring a length of the flexible display 560 which is slid out, using a sensor (e.g., the sensor module 550 of FIG. 5B), an operation of determining that the electronic device 500 is in a non-expanded state when the length of the flexible display 560 measured using the sensor 550 is a preconfigured first length, and determining that the electronic device 500 is in an expanded state when the length of the flexible display measured using the sensor 550 is a second length relatively longer than the first length, an operation of controlling such that when the electronic device 500 is in an expanded state, first content is displayed in the first area 511 and a user interface corresponding to at least one application and/or second content obtained by converting the first content into a form corresponding to a function provided by the at least one application is displayed in a second area (e.g., the second area 512 of FIG. 5B) including a partial area of the flexible display 560, which is slid out from the housing (not shown) to be visually exposed, and an operation of transmitting, in response to a user input, data corresponding to the first content to a server connected to the at least one application.

Referring to FIG. 13A operation 1310, the processor 530 may detect an expansion operation of the electronic device 500 through the sensor module 550.

The expansion operation of the electronic device 500 may include an unfolding operation of a foldable display and/or a sliding-out operation of a rollable/slidable display. The expansion process of the electronic device 500 and the process of recognizing the same have been described in detail above with reference to FIGS. 2 to 4. The processor 530 may detect the expansion of the electronic device 500 through the process above and may control a screen displayed in the expanded display area.

In operation 1320, the processor 530 may determine the application execution state of the electronic device 500 before the expansion of the electronic device 500. For example, the processor 530 may determine whether a social network service (SNS) application related to content (e.g., image or photo) is being used by a user before the expansion of the electronic device 500. The social network service (SNS) application may refer to an application capable of executing content sharing, uploading, or editing. The processor 530 may determine the type of an application classified as a social network service (SNS) application according to a unique setting of the electronic device 500 or user setting. In addition, the type and arrangement of social network service (SNS) applications displayed in the second area 512 may also be preconfigured by a user.

According to various embodiments, when the SNS application (601 and/or 602 of FIG. 6) is being used before the electronic device 500 is expanded, the processor 530 may display, on the expanded display, the content uploaded from the SNS application being used together with the SNS application.

According to various embodiments, the processor 530 may display a content screen in the first area 511 and may display the SNS application being executed in the electronic device 500 or at least one preconfigured SNS application in the second area 512. This has been described in detail with reference to FIG. 6 above.

In operation 1320, if an SNS application is being used before the expansion of the electronic device 500, the processor 530 may analyze a ratio and filter effect of the SNS application in operation 1330. Thereafter, the processor 530 may synchronize the ratio of the SNS application with that of the content screen in operation 1335. In this case, the content screen may be executed separately from the SNS application by an internal application configured to execute content in the electronic device 500. When the SNS application and the content screen are synchronized with each other, a user may control not only the content in the first area 511 but also the content displayed in the second area 512 at the same time through a touch input to the first area 511, as described with reference to FIGS. 7 to 8.

Referring to FIG. 13B, in operation 1340, the processor 530 may detect a user's touch input related to content. The touch input related to content may include a touch input to expand/reduce content or to move focus thereof, as described with reference to FIGS. 7 to 8. When a user's touch input related to content is sensed, the processor 530 may simultaneously apply a user command to the content screen and the SNS application screen in operation 1350. Through a single touch input, the user may control not only the content screen to which the touch input is applied, but also the content of other SNS applications. In addition, the same effect is applied to the SNS application screen, so that a user can check a preview of content to be uploaded on an SNS. In addition, as described with reference to FIG. 11, the processor 530 may further display an icon for swap on an SNS application screen. When a user's touch input is applied to the corresponding icon, the processor 530 may swap the application screen in the second area 512 to which a touch input is applied with the content screen in the first area 511.

In operation 1360, the processor 530 may provide, to the second area 512, a guide screen including an icon for storing, uploading, sharing content, or applying a filter effect to the content. As described with reference to FIGS. 9 to 10, a user may store, upload, share, or filter content through a touch input to an icon displayed on the guide screen.

Figure 14A:
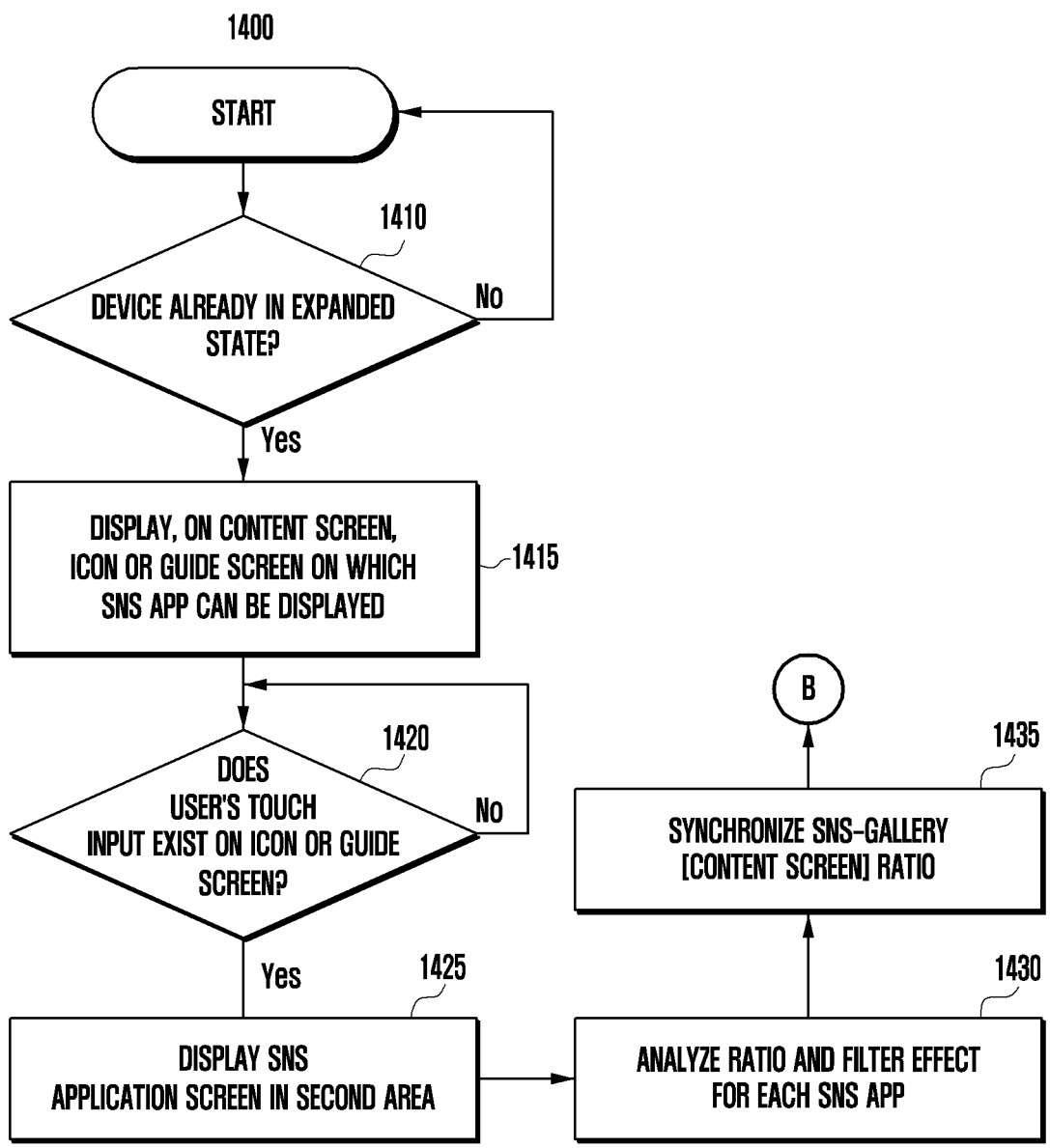
FIGS. 14A and 14B are flowcharts illustrating an example method for providing content by the electronic device 500 according to various embodiments.
Figure 14B:
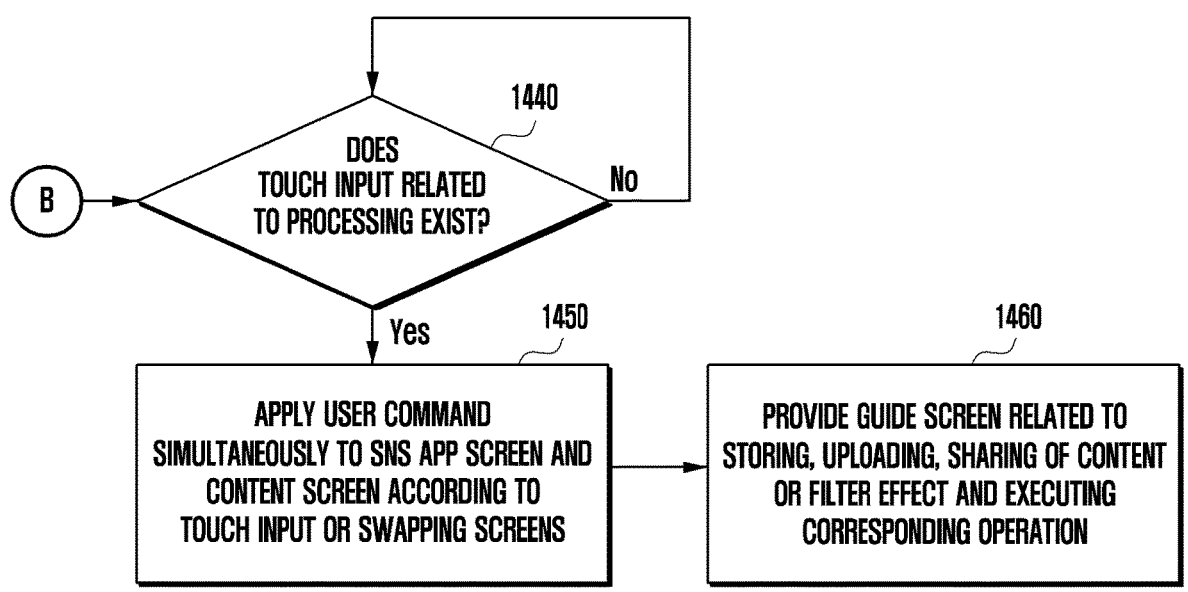

FIGS. 14A and 14B are flowcharts illustrating an example method for providing content by the electronic device 500 according to various embodiments.

The described content providing method 1400 may be executed through the electronic device (e.g., the electronic device 500 of FIG. 5B) described above with reference to FIGS. 1 to 12, and the technical features described above will be omitted below.

FIGS. 14A and 14B illustrate a process in which an SNS application screen is manually displayed in the second area 512 by a user when the electronic device 500 is already expanded. In operation 1410, the processor 530 may detect whether the electronic device 500 has already been expanded. When a content screen is executed by a user while the electronic device 500 is already expanded, the processor 530 may display an icon or a guide screen related to an SNS application on a part of the content screen in operation 1415. In operation 1420, when a touch input is applied to the icon or guide screen by a user, the processor 530 may detect the touch input. In this case, in operation 1425, the processor 530 may reduce a content screen being used while the electronic device 500 is already expanded and may display the same on the first area 511, and may display an application screen related to the content screen being used in the remaining second area 512. In this case, at least one application screen can be displayed in the second area 512. The type and arrangement of application screens that can be displayed in the second area 512 may be preconfigured by the user.

In operation 1430, the processor 530 may analyze a ratio and a filter effect which are related to at least one SNS application displayed in the second area 512 and may apply the same to the electronic device 500. The filter effect may include various filter effects described above with reference to FIGS. 9 to 10. In operation 1435, the processor 530 may synchronize a ratio of at least one SNS application displayed in the second area 512 with that of the content screen.

In operation 1440, the processor 530 may detect a user's touch input related to content. The touch input related to content may include the touch input 811 to expand/reduce content or to move focus thereof, as described with reference to FIGS. 7 to 8. When a user's touch input related to content is sensed, the processor 530 may simultaneously apply a user command to the content screen and the SNS application screen in operation 1450. Through a single touch input, the user may control not only the content screen to which the touch input is applied, but also the content of other SNS applications. In addition, the same effect is applied to the SNS application screen, so that a user can check a preview of content to be uploaded on an SNS. In addition, as described with reference to FIG. 11, the processor 530 may further display an icon for swap on an SNS application screen. When a user's touch input is applied to the corresponding icon, the processor 530 may swap the application screen in the second area 512 to which a touch input is applied with the content screen in the first area 511.

In operation 1460, the processor 530 may provide, to the second area 512, a guide screen (e.g., 1210 to 1230 of FIG. 12) including an icon for storing, uploading, sharing content, or applying a filter effect to the content. As described with reference to FIGS. 9 to 10, a user may store, upload, share, or filter content through a touch input to an icon displayed on the guide screen.

According to an embodiment, the first content that may be displayed on the first area 511 may include a static image (e.g., photo content) and a dynamic image (e.g., video content).

According to an embodiment, the second content may include a content preview screen to be used when the first content is uploaded to a server connected to the at least one application, and the flexible display 560 may be expanded in at least one of upward, downward, leftward, and rightward directions.

According to an embodiment, the at least one application may include at least one social networking service (SNS) application and may provide, to the second area 512, a guide screen corresponding to at least one of a function for converting a format of the first content, a function for applying a graphic effect to the first content, a function for changing a magnification of the first content, a function for changing a resolution of the first content, a function for changing a ratio of the first content, or a function for changing a size of the first content.

According to an embodiment, the operation of, in response to a user input, converting the first content into a form corresponding to a function provided by the at least one application and transmitting the converted first content to a server connected to the at least one application may include an operation of providing a guide screen listing filter effects related to the first content to the second area 512, an operation of determining a filter effect to be applied to the first content in response to a user input to the guide screen, an operation of producing second content by applying a filter effect and/or user input to the first content, and an operation of uploading the second content to a server of at least one application.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a flexible display having at least a partial area configured to be drawn out from the housing so that a size of a visible area of the flexible display can be changed;
a sensor configured to measure a length of the flexible display;
a memory; and
at least one processor operatively connected to the memory, the sensor, and the flexible display, and configured to control the electronic device to:
display first content in a first area comprising a partial area of the flexible display, in response to an input,
measure a length of the visible area of the flexible display from the housing using the sensor,
based on the length of the visible area of the flexible display measured using the sensor being a specified first length, determine that the electronic device is in a non-expanded state,
based on the length of the visible area of the flexible display measured using the sensor being a second length longer than the first length, determine that the electronic device is in an expanded state,
based on the electronic device being in an expanded state, display the first content in the first area, and display a user interface corresponding to at least one application and/or second content in a second area, wherein the second area comprises a partial area of the flexible display drawn out from the housing to be visible, and the second content is to be obtained by converting the first content into a form corresponding to a function provided by the at least one application
transmit, in response to an input, data corresponding to the first content to a server connected to the at least one application,
display a swap-related icon on an execution screen of the at least one application screen related to the second content in the second area, and
based on an input on the swap-related icon, swap a position of the first content in the first area with that of the execution screen of the at least one application displayed in the second area.

2. The electronic device of claim 1, wherein the second content comprises a content preview screen to be used based on the first content being uploaded to a server connected to the at least one application, and
wherein the flexible display comprises at least one expansion display area configured to be expanded in at least one of upward, downward, leftward, and rightward directions.

3. The electronic device of claim 1, wherein the at least one application comprises at least one social networking service (SNS) application.

4. The electronic device of claim 1, wherein the at least one application is configured to provide, onto the second area, a guide screen for a function corresponding to at least one of a function for converting a format of the first content, a function for applying a graphic effect to the first content, a function for changing a magnification of the first content, a function for changing a ratio of the first content, a function for changing a resolution of the first content, or a function for adjusting a size of the first content.

5. The electronic device of claim 1, wherein the at least one processor is configured to control the electronic device to:
provide a guide screen listing filter effects related to the first content to the second area,
determine a filter effect to be applied to the first content based on an input to the guide screen, and
produce second content by applying the filter effect and/or the input to the first content.

6. The electronic device of claim 5, wherein the at least one processor is configured to control the electronic device to:
provide a guide screen related to uploading of the second content, and
upload that the second content to a sever of the at least one application.

7. The electronic device of claim 1, wherein based on the positions of the first content in the first area and the application screen displayed in the second area and comprising the swap-related icon being swapped with each other, the at least one processor is configured to control the electronic device to:
receive a command input to the application screen comprising the swap-related icon, and equally control the at least one application screen displayed in the second area and the application screen displayed in the first area by the swap based on the command and comprising the swap-related icon.

8. The electronic device of claim 1, wherein the at least one processor is configured to control the electronic device to:
provide a guide screen listing filter effects related to the first content to the second area,
determine a filter effect to be applied to the application screen comprising the swap-related icon based on an input to the guide screen, and
produce the second content by applying the filter effect and/or the input to the application screen comprising the swap-related icon.

9. An electronic device comprising:
a housing;
a memory;
a first display disposed on the first surface of the housing and configured to be foldable;
a sensor configured to sense whether the first display is folded; and
at least one processor operatively connected to the first display, the sensor, and the memory,
wherein the first display is foldable, and based on the first display being folded, a first area and a second area of the first display, divided with reference to an area where the first display is folded, face each other, and
wherein the at least one processor is configured to control the electronic device to:
detect unfolding of the first display through the sensor,
based on the first display being unfolded, display first content in the first area,
display a user interface corresponding to at least one application and/or second content obtained by converting the first content into a form corresponding to a function provided by the at least one application in the second area,
transmit, in response to an input, data corresponding to the first content to a server connected to the at least one application, display a swap-related icon on an execution screen of the at least one application screen related to the second content in the second area, and
based on an input on the swap-related icon, swap a position of the first content in the first area with that of the execution screen of the at least one application displayed in the second area.

10. The electronic device of claim 9, wherein the second content comprises a content preview screen to be used based on the first content being uploaded to a server connected to the at least one application, and
wherein the at least one application comprises at least one social networking service (SNS) application.

11. The electronic device of claim 9, wherein the at least one application is configured to provide, onto the second area, a guide screen corresponding to at least one of a function for converting a format of the first content, a function for applying a graphic effect to the first content, a function for changing a magnification of the first content, a function for changing a ratio of the first content, a function for changing a resolution of the first content, or a function for adjusting a size of the first content.

12. The electronic device of claim 9, wherein the at least one processor is configured to control the electronic device to:
provide a guide screen listing filter effects related to the first content to the second area, determine a filter effect to be applied to the first content based on an input to the guide screen, and produce the second content in response to the filter effect and/or the input to the first content.

13. The electronic device of claim 12, wherein the at least one processor is configured to control the electronic device to provide a guide screen related to uploading of the second content and upload the second content to a server of the at least application.

14. The electronic device of claim 9,
wherein based on the positions of the first content in the first area and the application screen displayed in the second area and comprising the swap-related icon being swapped with each other, the at least one processor is configured to control the electronic device to:
receive a command input to the application screen comprising the swap-related icon, and equally control the at least one application screen displayed in the second area and the application screen displayed in the first area in response to the command and comprising the swap-related icon.

15. The electronic device of claim 14, wherein the at least one processor is configured to control the electronic device to:
provide a guide screen listing filter effects related to the first content to the second area,
determine a filter effect to be applied to the application screen comprising the swap-related icon based on an input to the guide screen, and
produce the second content by applying the filter effect and/or the command to the application screen comprising the swap-related icon.

16. A method for providing content by an electronic device, the method comprising:
displaying first content in a first area comprising a partial area of the flexible display, in response to an input;
measuring, using a sensor, a length of a visible area of the flexible display drawn out from the electronic device;
based on the length of the visible area of the flexible display measured using the sensor being a specified first length, determining that the electronic device is in a non-expanded state, and based on the length of the visible area of the flexible display measured using the sensor being a second length longer than the first length, determining that the electronic device is in an expanded state;

based on the electronic device being in an expanded state, the first content is displayed in the first area, and a user interface corresponding to at least one application and/or second content obtained by converting the first content into a form corresponding to a function provided by the at least one application is displayed in a second area comprising a partial area of the flexible display drawn out from the housing to be visible;

transmitting, in response to an input, data corresponding to the first content to a server connected to the at least one application displaying a swap-related icon on an execution screen of the at least one application screen related to the second content in the second area, and based on an input on the swap-related icon, swapping a position of the first content in the first area with that of the execution screen of the at least one application displayed in the second area.

17. The method of claim 16, wherein the second content comprises a content preview screen to be used based on the first content being uploaded to a server connected to the at least one application, and wherein the flexible display can be expanded in at least one of upward, downward, leftward, and rightward directions.

18. The method of claim 16, wherein the at least one application comprises at least one social networking service (SNS) application, and is configured to provide, onto the second area, a guide screen corresponding to at least one of a function for converting a format of the first content, a function for applying a graphic effect to the first content, a function for changing a magnification of the first content, a function for changing a resolution of the first content, a function for changing a ratio of the first content, or a function for adjusting a size of the first content.

19. The method of claim 16, wherein the converting of the first content into a form corresponding to a function provided by the at least one application in response to a user input and transmitting of the converted first content to a server connected to the at least one application comprises:
providing a guide screen listing filter effects related to the first content to the second area;
determining a filter effect to be applied to the first content in response to an input to the guide screen;
producing the second content by applying a filter effect and/or input to the first content; and
uploading the second content to a server of the at least one application.

* * * * *